(12) United States Patent
Hiew et al.

(10) Patent No.: US 7,440,286 B2
(45) Date of Patent: Oct. 21, 2008

(54) EXTENDED USB DUAL-PERSONALITY CARD READER

(75) Inventors: Siew S. Hiew, San Jose, CA (US); Nan Nan, San Jose, CA (US); Jim Chin-Nan Ni, San Jose, CA (US); Abraham C. Ma, Fremont, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 0 days.

(21) Appl. No.: 11/927,549

(22) Filed: Oct. 29, 2007

(65) Prior Publication Data

US 2008/0067248 A1 Mar. 20, 2008

Related U.S. Application Data

(63) Continuation-in-part of application No. 11/773,830, filed on Jul. 5, 2007, which is a continuation-in-part of application No. 11/112,501, filed on Apr. 21, 2005, now Pat. No. 7,269,004, which is a continuation-in-part of application No. 11/868,873, filed on Oct. 8, 2007.

(51) Int. Cl.
*H05K 7/14* (2006.01)

(52) U.S. Cl. .................. 361/737; 361/715; 361/727

(58) Field of Classification Search ............... 361/737, 361/727, 683–686, 715; 439/607, 374, 79, 439/379, 610, 680
See application file for complete search history.

(56) References Cited

U.S. PATENT DOCUMENTS

| | | | |
|---|---|---|---|
| 5,397,857 A | 3/1995 | Farquhar et al. | |
| 5,404,485 A | 4/1995 | Ban | |
| 5,414,597 A | 5/1995 | Lindland et al. | |
| 5,430,859 A | 7/1995 | Norman et al. | |
| 5,479,638 A | 12/1995 | Assar et al. | |
| 5,530,622 A * | 6/1996 | Takiar et al. | ............ 361/737 |

(Continued)

OTHER PUBLICATIONS

USB FlashCard "Main Body Dimensions", "Top View", "Bottom View" Web pages, Lexar, 2004, 3 pages.

(Continued)

*Primary Examiner*—Hung S Bui
(74) *Attorney, Agent, or Firm*—Bever, Hoffman & Harms, LLP; Patrick T. Bever

(57) ABSTRACT

A dual-personality card reader system supports both USB and micro-SD devices using a card reader and an extended 9-pin USB socket. The card reader includes a PCBA having four standard USB metal contact pads and several extended purpose contact pads disposed on an upper side, components and IC chips covered by a molded case on a lower side, a molded lead-frame connector mounted on the PCBA and including five forward-facing extended purpose pins and eight rear-facing micro-SD connector pins that communicate with the PCBA through the extended purpose contact pads, and a housing including a slot for receiving a micro-SD card such that it communicates with the PCBA through the micro-SD connector pins. The extended 9-pin USB socket includes standard USB contacts and extended use contacts that communicate with the PCBA through the standard USB metal contacts and forward-facing extended purpose pins. The PCBA includes dual-personality electronics for SD/USB communications.

16 Claims, 25 Drawing Sheets

U.S. PATENT DOCUMENTS

| | | | |
|---|---|---|---|
| 5,623,552 A | 4/1997 | Lane | |
| 5,835,760 A | 11/1998 | Harmer | |
| 5,959,541 A | 9/1999 | DiMaria et al. | |
| 6,000,006 A | 12/1999 | Bruce et al. | |
| 6,012,636 A | 1/2000 | Smith | |
| 6,044,428 A | 3/2000 | Rayabhari | |
| 6,069,920 A | 5/2000 | Schulz et al. | |
| 6,125,192 A | 9/2000 | Bjorn et al. | |
| 6,148,354 A | 11/2000 | Ban et al. | |
| 6,193,152 B1 | 2/2001 | Fernando et al. | |
| 6,231,363 B1* | 5/2001 | Kosmala | 439/260 |
| 6,241,534 B1* | 6/2001 | Neer et al. | 439/76.1 |
| 6,292,863 B1 | 9/2001 | Terasaki et al. | |
| 6,297,448 B1 | 10/2001 | Hara | |
| 6,313,400 B1 | 11/2001 | Mosquera et al. | |
| 6,321,478 B1 | 11/2001 | Klebes | |
| 6,438,638 B1 | 8/2002 | Jones et al. | |
| 6,475,830 B1 | 11/2002 | Brillhart | |
| 6,615,404 B1 | 9/2003 | Garfunkel et al. | |
| 6,618,243 B1 | 9/2003 | Tirosh | |
| 6,624,005 B1 | 9/2003 | DiCaprio et al. | |
| 6,671,808 B1 | 12/2003 | Abbott et al. | |
| 6,676,420 B1 | 1/2004 | Liu et al. | |
| 6,718,407 B2 | 4/2004 | Martwick | |
| 6,733,329 B2 | 5/2004 | Yang | |
| 6,757,783 B2 | 6/2004 | Koh | |
| 6,763,410 B2 | 7/2004 | Yu | |
| 6,773,192 B1 | 8/2004 | Chao | |
| 6,778,401 B1 | 8/2004 | Yu et al. | |
| 6,832,281 B2 | 12/2004 | Jones et al. | |
| 6,854,984 B1 | 2/2005 | Lee et al. | |
| 6,900,988 B2 | 5/2005 | Yen | |
| 6,940,153 B2 | 9/2005 | Spencer et al. | |
| 6,944,028 B1 | 9/2005 | Yu et al. | |
| 7,011,247 B2* | 3/2006 | Drabczuk et al. | 235/451 |
| 7,021,971 B2 | 4/2006 | Chou et al. | |
| 7,104,809 B1* | 9/2006 | Huang | 439/76.1 |
| 7,104,848 B1 | 9/2006 | Chou et al. | |
| 7,108,560 B1 | 9/2006 | Chou et al. | |
| 7,125,287 B1 | 10/2006 | Chou et al. | |
| 2001/0038547 A1 | 11/2001 | Jigour et al. | |
| 2001/0043174 A1 | 11/2001 | Jacobsen et al. | |
| 2002/0036922 A1 | 3/2002 | Roohparvar | |
| 2002/0116668 A1 | 8/2002 | Chhor et al. | |
| 2002/0166023 A1 | 11/2002 | Nolan et al. | |
| 2003/0038043 A1 | 2/2003 | Painsith | |
| 2003/0046510 A1 | 3/2003 | North | |
| 2003/0100203 A1 | 5/2003 | Yen | |
| 2003/0163656 A1 | 8/2003 | Ganton | |
| 2003/0177300 A1 | 9/2003 | Lee et al. | |
| 2003/0182528 A1 | 9/2003 | Ajiro | |
| 2004/0034765 A1 | 2/2004 | O'Connell | |
| 2004/0066693 A1 | 4/2004 | Osako | |
| 2004/0087213 A1 | 5/2004 | Kao | |
| 2004/0137664 A1 | 7/2004 | Elazar et al. | |
| 2004/0143716 A1 | 7/2004 | Hong | |
| 2004/0145875 A1 | 7/2004 | Yu et al. | |
| 2004/0148482 A1 | 7/2004 | Grundy et al. | |
| 2004/0153595 A1 | 8/2004 | Sukegawa et al. | |
| 2004/0195339 A1 | 10/2004 | Chen et al. | |
| 2004/0255054 A1 | 12/2004 | Pua et al. | |
| 2005/0009388 A1 | 1/2005 | Chao | |
| 2005/0114587 A1 | 5/2005 | Chou et al. | |
| 2005/0182858 A1 | 8/2005 | Lo et al. | |
| 2005/0193161 A1 | 9/2005 | Lee et al. | |
| 2005/0193162 A1 | 9/2005 | Chou et al. | |
| 2005/0216624 A1 | 9/2005 | Deng et al. | |
| 2005/0218200 A1 | 10/2005 | Focke et al. | |
| 2005/0248926 A1 | 11/2005 | Asom et al. | |

OTHER PUBLICATIONS

USB 'A' Plug Form Factor, Revision 0.9, Guideline for Embedded USB Device Applications, Nov. 29, 2004, 4 pages.

\* cited by examiner

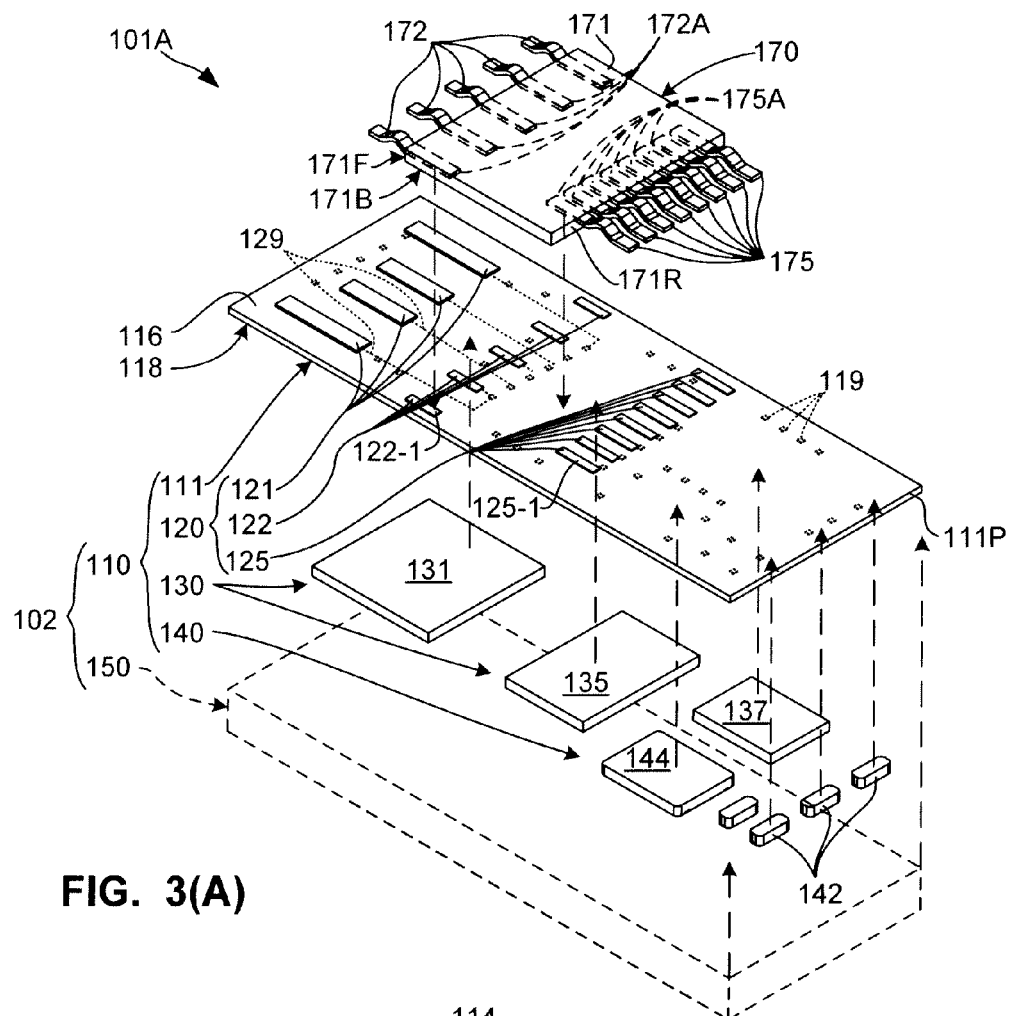
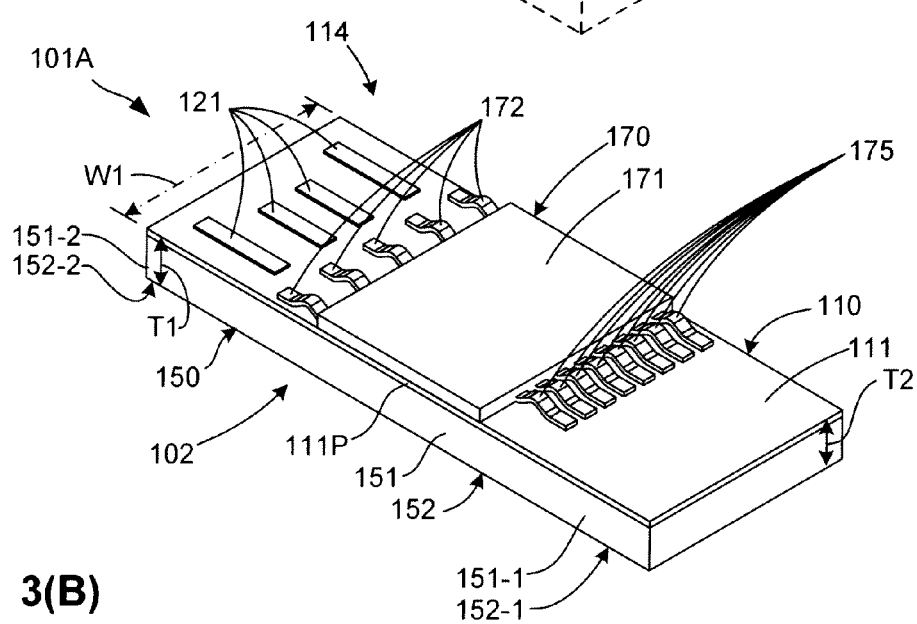

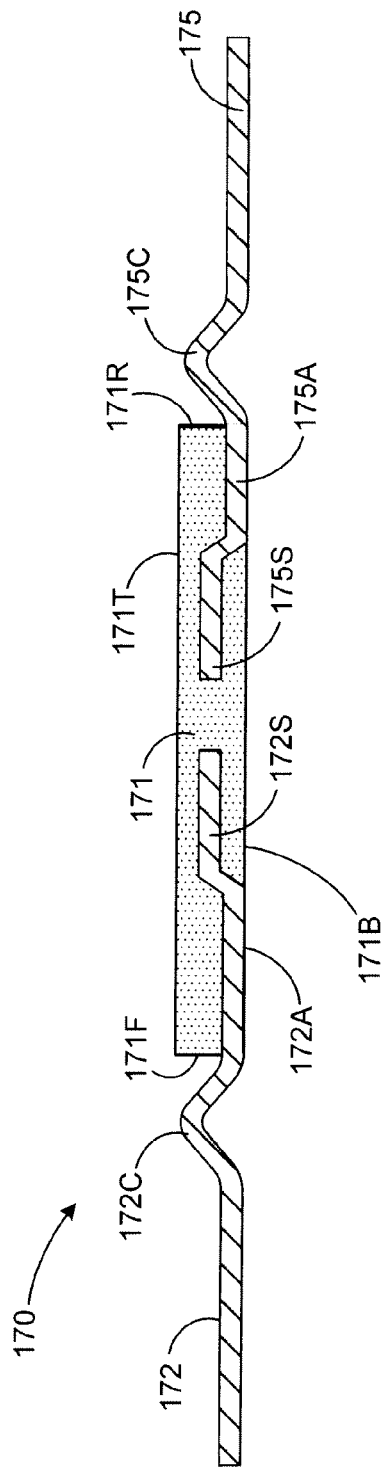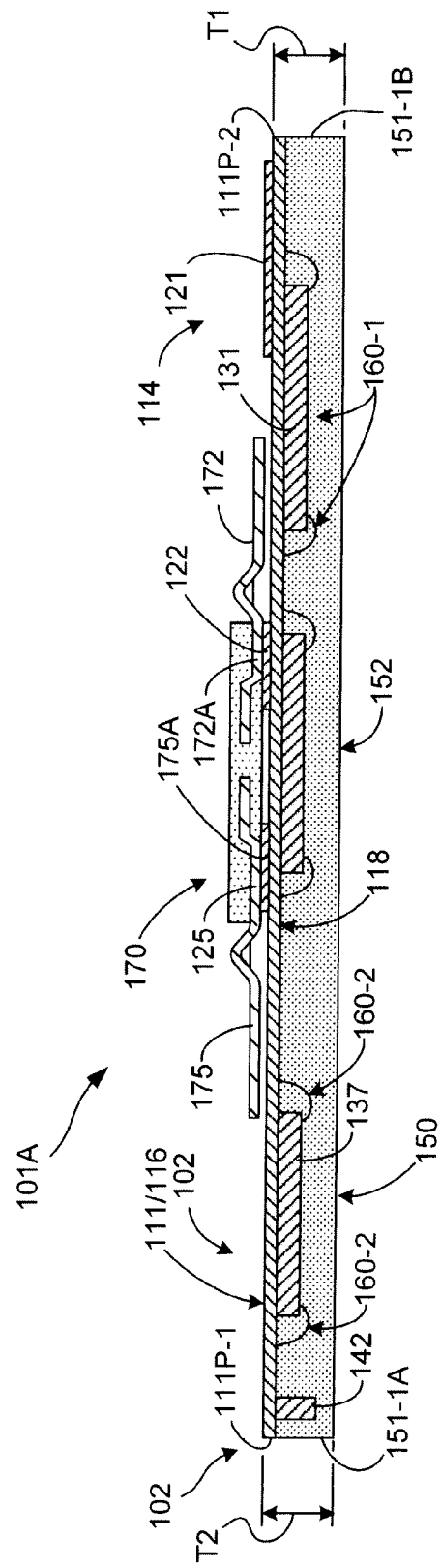
FIG. 4(A)
FIG. 4(B)

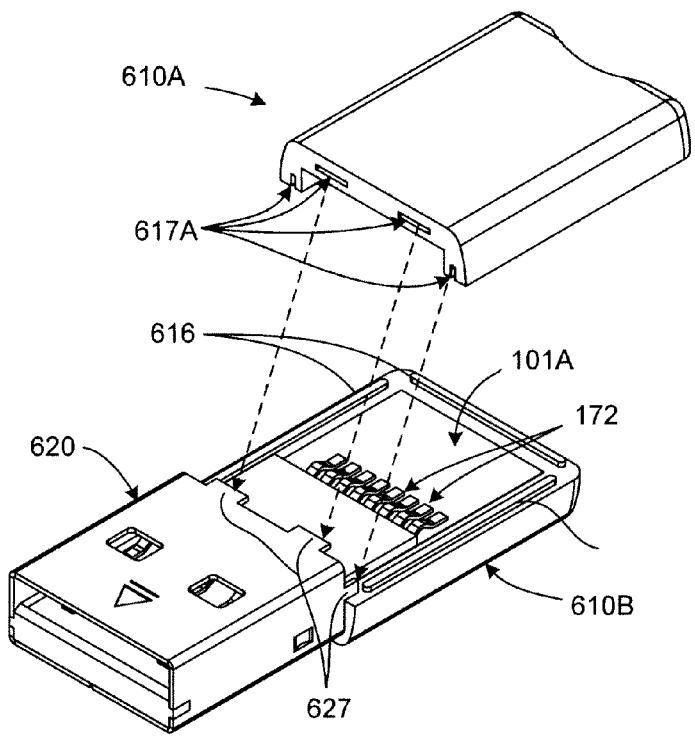
FIG. 20(A)
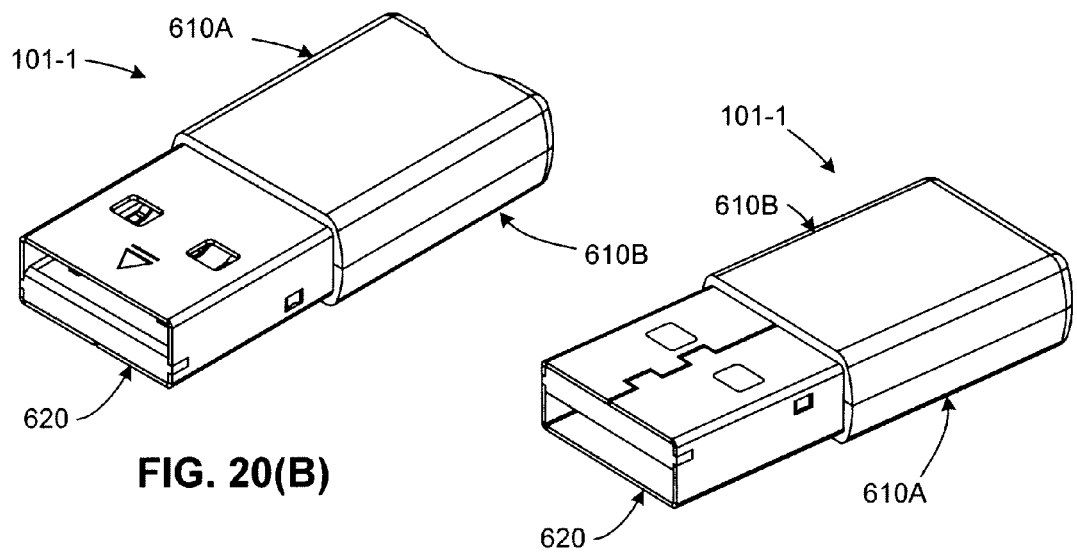
FIG. 20(B)
FIG. 20(C)

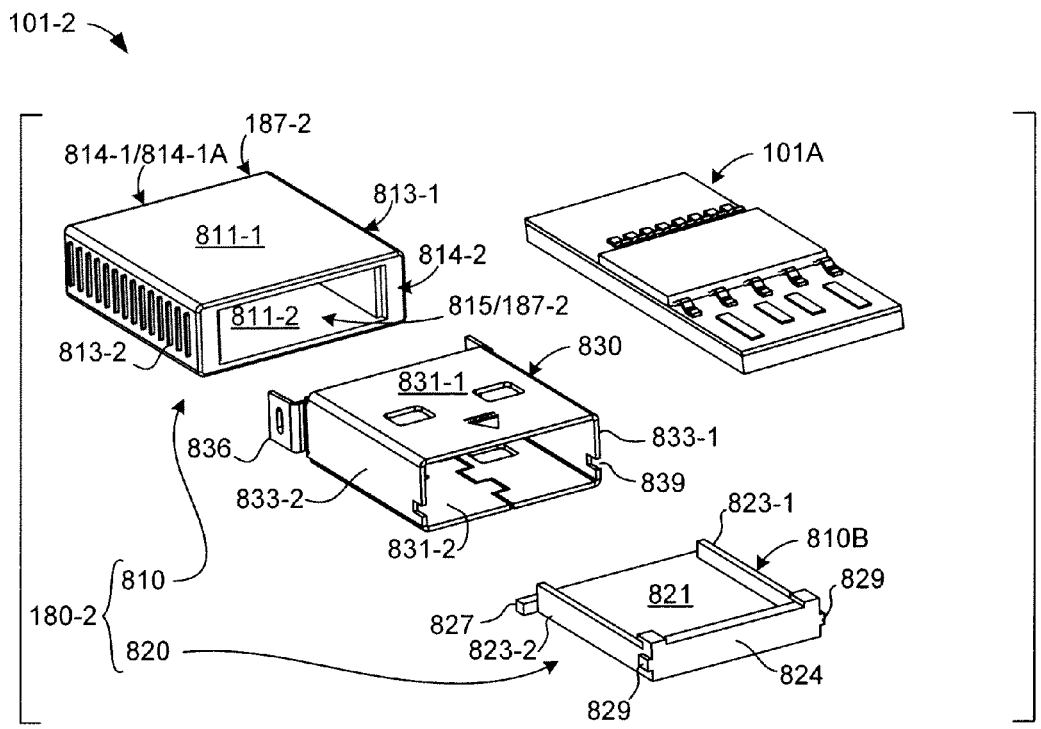
FIG. 26
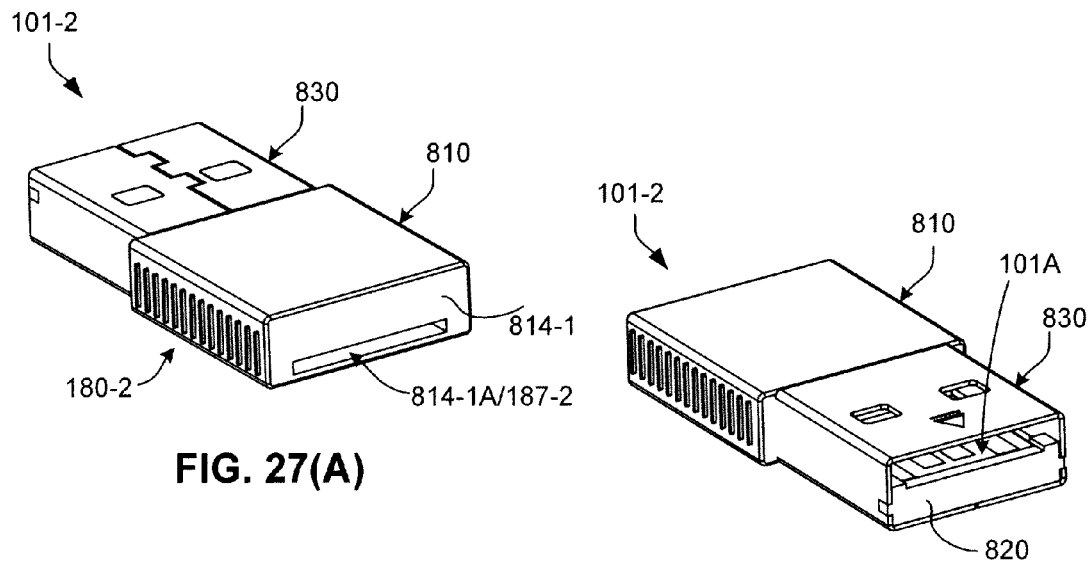
FIG. 27(A)
FIG. 27(B)

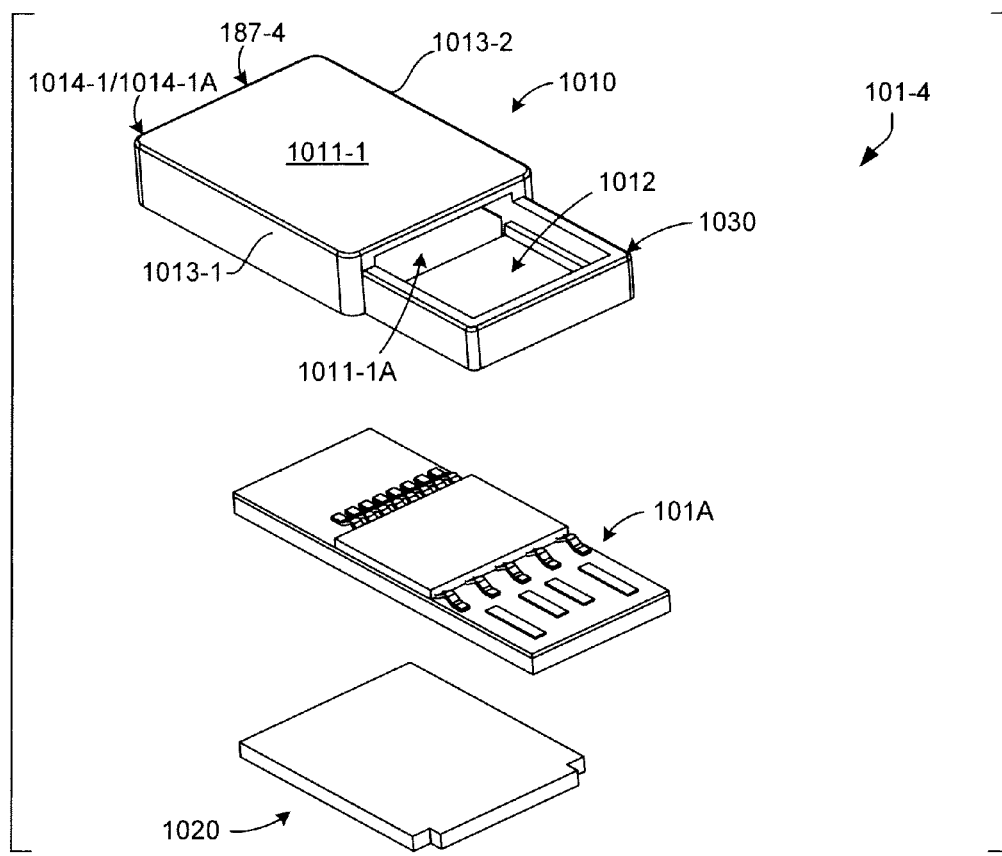
FIG. 30
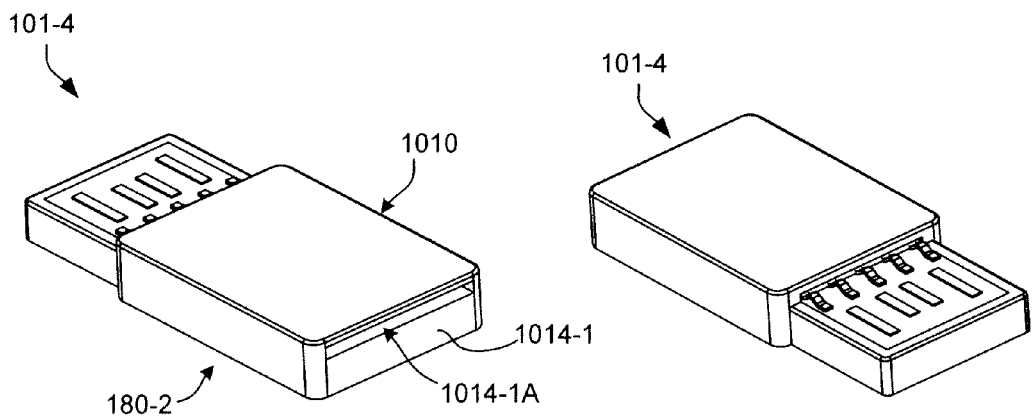
FIG. 31(A)  FIG. 31(B)

US 7,440,286 B2

EXTENDED USB DUAL-PERSONALITY CARD READER

RELATED APPLICATIONS

This application is a CIP of U.S. patent application for "Molding Methods To Manufacture Single-Chip Chip-On-Board USB Device" U.S. application Ser. No. 11/773,830, filed Jul. 5, 2007, which is a CIP of U.S. patent application for "Low-Profile USB Device", U.S. application Ser. No. 11/112, 501, filed on Apr. 21, 2005 now U.S. Pat. No. 7,269,004.

This application is also a CIP of U.S. patent application for "Extended USB PCBA And Device With Dual Personality" U.S. application Ser. No. 11/868,873, filed Oct. 8, 2007.

This application is also related to co-owned U.S. Pat. Nos. 7,021,971, 7,108,560, 7,125,287, and 7,104,848.

FIELD OF THE INVENTION

This invention relates to portable electronic devices, and more particularly to portable electronic devices with expanded Universal-Serial-Bus (USB) connections.

BACKGROUND OF THE INVENTION

Universal-Serial-Bus (USB) has been widely deployed as a standard bus for connecting peripherals such as digital cameras and music players to personal computers (PCs) and other devices. Currently, the top transfer rate of USB is 480 Mb/s, which is quite sufficient for most applications. Faster serial-bus interfaces are being introduced to address different requirements. PCI Express, at 2.5 Gb/s, and SATA, at 1.5 Gb/s and 3.0 Gb/s, are two examples of high-speed serial bus interfaces for the next generation devices, as are IEEE 1394 and Serial Attached Small-Computer System Interface (SCSI).

FIG. 32(A) shows a prior-art peripheral-side USB connector. USB connector 10 may be mounted on a board in the peripheral. USB connector 10 can be mounted in an opening in a plastic case (not shown) for the peripheral.

USB connector 10 contains a small connector substrate 14, which is often white ceramic, black rigid plastic, or another sturdy substrate. Connector substrate 14 has four or more metal contacts 16 formed thereon. Metal contacts 16 carry the USB signals generated or received by a controller chip in the peripheral. USB signals include power, ground, and serial differential data D+, D−.

USB connector 10 contains a metal case that wraps around connector substrate 14. The metal case touches connector substrate 14 on three of the sides of connector substrate 14. The top side of connector substrate 14, holding metal contacts 16, has a large gap to the top of the metal case. On the top and bottom of this metal wrap are formed holes 12. USB connector 10 is a male connector, such as a type-A USB connector.

FIG. 32(B) shows a female USB connector. Female USB connector 20 can be an integral part of a host or PC, or can be connected by a cable. Another connector substrate 22 contains four metal contacts 24 that make electrical contact with the four metal contacts 16 of the male USB connector 10 of FIG. 32(A). Connector substrate 22 is wrapped by a metal case, but small gaps are between the metal case and connector substrate 22 on the lower three sides.

Locking is provided by metal springs 18 in the top and bottom of the metal case. When male USB connector 10 of FIG. 32(A) is flipped over and inserted into Female USB connector 20 of FIG. 32(B), metal springs 18 lock into holes 12 of male USB connector 10. This allows the metal casings to be connected together and grounded.

Flash-memory cards are widely used for storing digital pictures captured by digital cameras. One useful format is Sony's Memory Stick (MS), having a small form factor roughly the size of a stick of chewing gum. Another highly popular format is Secure-Digital (SD), which is an extension of the earlier MultiMediaCard (MMC) format. SD cards are relatively thin, having an area roughly the size of a large postage stamp. In addition, SD cards come in a variety of "flavors" including micro-SD cards, which have only eight pins.

SD cards are also useful as add-on memory cards for other devices, such as portable music players, personal digital assistants (PDAs), and even notebook computers. SD cards are hot-swappable, allowing the user to easily insert and remove SD cards without rebooting or cycling power. Since the SD cards are small, durable, and removable, data files can easily be transported among electronic devices by being copied to an SD card. SD cards are not limited to flash-memory cards. Other applications such as communications transceivers can be implemented as SD cards.

The SD interface currently supports a top transfer rate of 100 Mb/s, which is sufficient for many applications. However, some applications such as storage and transport of full-motion video may benefit from higher transfer rates.

Other bus interfaces offer higher transfer rates. Universal-Serial-Bus (USB), for example, has a top transfer rate of 480 Mb/s. Peripheral-Component-Interconnect (PCI) Express, at 2.5 Gb/s, and Serial-Advanced-Technology-Attachment (SATA), at 1.5 Gb/s and 3.0 Gb/s, are two examples of high-speed serial bus interfaces for next generation devices. IEEE 1394 (Firewire) supports 3.2 Gb/s. Serial Attached Small-Computer System Interface (SCSI) supports 1.5 Gb/s. These are roughly 5 to 32 times faster than the SD interface.

What is needed is a flexible system that supports both standard Universal-Serial-Bus (USB) devices and one or more secondary flash memory devices (e.g., micro-Secure Digital (micro-SD) cards) using a single (e.g., either standard USB or special dual-personality) socket. In particular, what is needed is that serves as an interface between a host system and the secondary flash memory devices (e.g., a micro-SD card) by way of the special dual-personality socket.

SUMMARY OF THE INVENTION

The present invention is directed to a dual-personality memory system that supports both standard Universal-Serial-Bus (USB) devices and one or more secondary flash memory devices (e.g., micro-Secure Digital (micro-SD) cards). A host side of the dual-personality memory system includes a multiple pin (e.g., 9-pin) USB female socket that is similar to a female USB socket, but in addition to the standard (four) USB contact pins, the extended multiple pin USB socket includes one or more additional rows of contacts that facilitate multiple pin communications between the host system and the secondary flash memory devices (e.g., a micro-SD card) by way of a novel extended USB dual-personality card reader.

The present invention is particularly directed to the extended USB dual-personality card reader that serves as an interface between host system (i.e., by way of the multiple pin USB female socket) and the secondary flash memory devices (e.g., a micro-SD card). The card reader includes at least one dual-personality communication integrated circuit (IC), four standard USB contact pads disposed near a front edge, several (e.g., five) front extended-purpose contact structures positioned behind the standard USB contact pads, several (e.g., eight) rear extended-purpose contact structures located behind the front contact structures, and an external housing. A front portion of the core component forms an extended, multiple pin (e.g., 9-pin) USB (male) connector plug that includes the standard USB contact pads and the front extended-purpose contact structures. The external housing includes a socket (e.g., a slot) for mounting the selected secondary flash memory devices (e.g., a micro-SD card) such that contact structures of the selected secondary flash memory device engage the rear extended-purpose contact structures. The dual-personality communication IC is configured to selectively communicate either with a standard USB host system by way of the standard USB contact pads (only), or with a dual-personality flash memory card system by way of all (e.g., nine) pins of the extended, multiple pin USB male connector plug. In addition, the dual-personality communication IC facilitates communications between the selected secondary flash memory device and the host system by way of the socket and rear-facing pins. Thus, the present invention facilitates adapting secondary memory devices (e.g., micro-SD cards) using a dual-personality USB high speed communication protocol, and is also backward compatible for use with a standard (e.g., USB 2.0) communication protocol.

In accordance with an embodiment of the present invention, the extended USB dual-personality card reader is manufactured by separately producing a modular core component and a molded lead-frame connector, mounting the molded lead-frame connector on the modular core component to form a sub-assembly, and then mounting the sub-assembly into a pre-molded external plastic housing. The modular core component includes a PCBA in the form of a rectangular block having all electronic components mounted to a lower surface of a PCB and encased by a plastic molded casing such that the upper surface of the PCB is exposed. Several metal contacts, including the four standard USB metal contact pads and two rows of extended-purpose contacts, are formed on the exposed upper surface of the PCB. The molded lead-frame connector includes several forward-facing pins extending from a front end of a plastic molded body and have corresponding first contact pads exposed through a lower surface of the molded body, and several rear-facing pins extending from a rear end of the molded body that have corresponding second contact pads exposed through the lower surface of the molded body. The molded lead-frame connector is then mounted onto the upper surface of the PCB such that each of the first and second contact pads is soldered to a corresponding extended-purpose contact pad disposed on the upper surface of the PCB. By forming the molded lead-frame connector in this manner, assembly (mounting) onto the PCBA of the modular core component is greatly simplified by enabling the use of established and highly cost effective surface-mount technology (SMT) techniques. The resulting structure forms a connector plug with the standard USB metal contact pads and the forward-facing pins being arranged such that, when said connector plug is inserted into said extended multiple pin USB socket, each of the standard USB contact pads contacts a corresponding standard USB contact of the extended multiple pin USB socket, and each of the forward-facing pins (extended-purpose contact structures) contacts a corresponding dual-personality contact of the extended multiple pin USB socket. By forming the sub-assembly in this manner, final assembly of the card reader into any of several external housings is greatly simplified, which reduces manufacturing costs by simplifying the assembly process.

According to an aspect of the invention, passive components are mounted onto the PCB using one or more standard surface mount technology (SMT) techniques, and one or more IC die (e.g., the dual-personality communication IC die and a flash memory die) are mounted using chip-on-board (COB) techniques. During the SMT process, the SMT-packaged passive components (e.g., capacitors, oscillators, and light emitting diodes) are mounted onto contact pads disposed on the PCB, and then known solder reflow techniques are utilized to connect leads of the passive components to the contact pads. During the subsequent COB process, the IC dies are secured onto the PCB using know die-bonding techniques, and then electrically connected to corresponding contact pads using, e.g., known wire bonding techniques. After the COB process is completed, the housing is formed over the passive components and IC dies using plastic molding techniques. By combining SMT and COB manufacturing techniques to produce modular USB core components, the present invention provides several advantages over conventional manufacturing methods that utilize SMT techniques only. First, by utilizing COB techniques to mount the USB controller and flash memory, the large PCB area typically taken up by SMT-packaged controllers and flash devices is dramatically reduced, thereby facilitating significant miniaturization of the resulting USB device footprint (i.e., providing a shorter device length and thinner device width). Second, the IC die height is greatly reduced, thereby facilitating stacked memory arrangements that greatly increase memory capacity of the USB devices without increasing the USB device footprint. Further, overall manufacturing costs are reduced by utilizing unpackaged controllers and flash devices (i.e., by eliminating the cost associated with SMT-package normally provided on the controllers and flash devices). Moreover, the molded housing provides greater moisture and water resistance and higher impact force resistance than that achieved using conventional manufacturing methods. Therefore, the combined COB and SMT method according to the present invention provides a less expensive and higher quality (i.e., more reliable) memory product with a smaller size than that possible using conventional SMT-only manufacturing methods.

According to an aspect of the present invention, the sub-assembly formed by mounting the molded lead-frame connector on the modular USB core component in the manner described above is disposed in a variety of plastic molded external housings so as to form a variety of card readers, each having a slot for receiving a micro-SD card. By forming the sub-assembly including the PCBA and the molded lead-frame connector, and then mounting the sub-assembly into an external housing, the present invention greatly simplifies the assembly process, thus reducing overall costs.

According to an aspect of the present invention, the sub-assembly formed by mounting the molded lead-frame connector on the modular USB core component in the manner described above is disposed in a variety of plastic molded external housings so as to form a variety of card readers, each having a slot for receiving a micro-SD card. By forming the sub-assembly including the PCBA and the molded lead-frame connector, and then mounting the sub-assembly into an external housing, the present invention greatly simplifies the assembly process, thus reducing overall costs.

In addition to providing functions as a micro-SD card reader, in accordance with another embodiment card readers include dual-purpose controllers that are modified to serve both as "standard" USB devices and as micro-SD card readers, thus enhancing their functionality. In alternative embodiments, significant memory capacity for use in the USB device mode (i.e., without requiring the insertion of a micro-SD card) are provided without increasing the overall size of card reader 101-1 by stacking flash memory die, and by combining the dual-purpose controller and flash memory in a single IC.

BRIEF DESCRIPTION OF THE DRAWINGS

These and other features, aspects and advantages of the present invention will become better understood with regard to the following description, appended claims, and accompanying drawings, where:

FIGS. 3(A) and 3(B) are exploded perspective and assembled perspective views showing a sub-assembly of the extended USB dual-personality card reader of FIG. 1 according to a specific embodiment of the present invention;

FIGS. 4(A) and 4(B) are an enlarged cross-sectional view showing a molded lead-frame connector of the sub-assembly of FIGS. 3(A) and 3(B), and a simplified cross-sectional view of the sub-assembly of FIG. 3(B), respectively;

FIGS. 20(A), 20(B) and 20(C) are exploded perspective, front top perspective and front bottom perspective views, respectively, showing a final assembly step for completing a card reader according to an embodiment of the present invention;

FIG. 26 is an exploded perspective view showing a card reader according to another embodiment of the present invention;

FIGS. 27(A) and 27(B) are bottom rear and top front perspective views showing the card reader of FIG. 26 after assembly is completed;

FIG. 30 is an exploded perspective view showing a card reader according to another embodiment of the present invention;

FIGS. 31(A) and 31(B) are rear and front perspective views showing the card reader of FIG. 30 after assembly is completed.

DETAILED DESCRIPTION OF THE DRAWINGS

The present invention relates to an improved method for manufacturing USB devices, and in particular to USB assemblies manufactured by the method. The following description is presented to enable one of ordinary skill in the art to make and use the invention as provided in the context of a particular application and its requirements. As used herein, the terms "upper", "upwards", "lower", and "downward" are intended to provide relative positions for purposes of description, and are not intended to designate an absolute frame of reference. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1A:
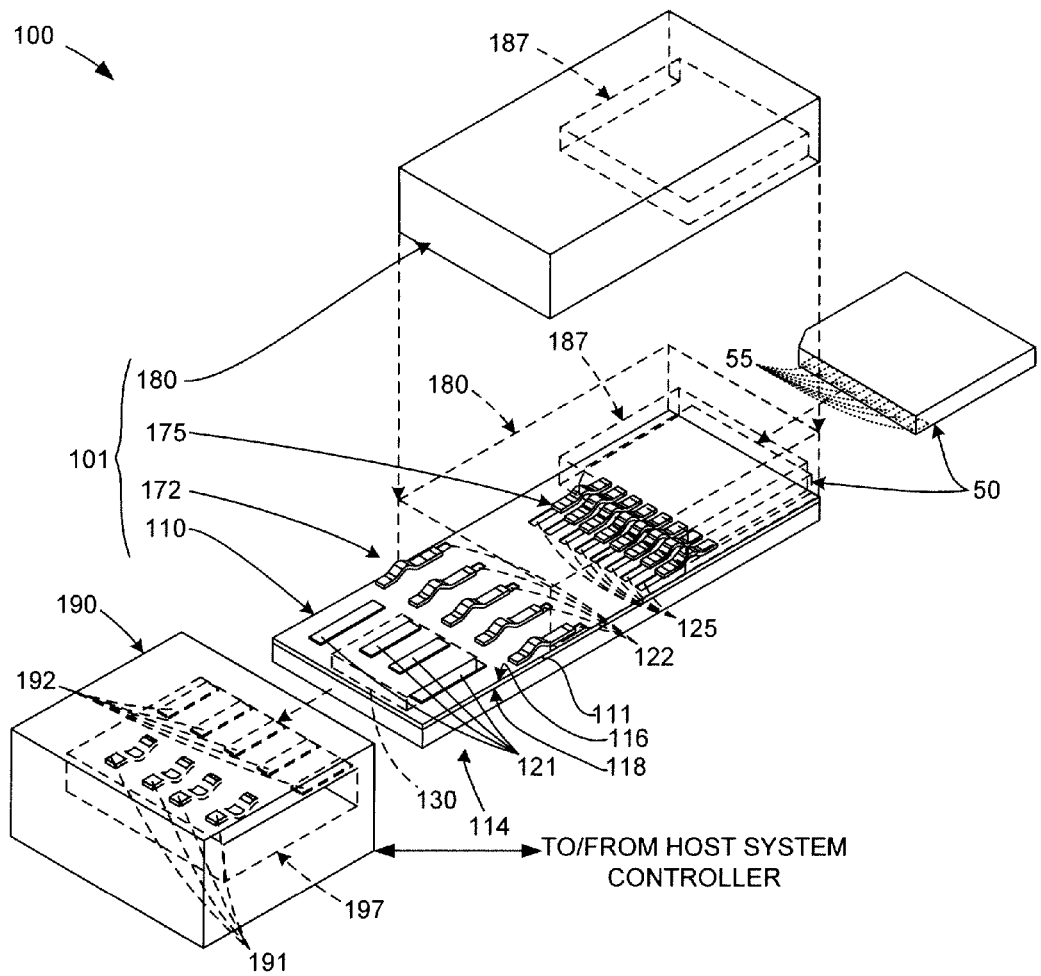
FIGS. 1(A) and 1(B) are perspective top and cross sectional side views showing a dual-personality USB memory system including an extended USB dual-personality card reader according to a simplified embodiment of the present invention.
Figure 1B:
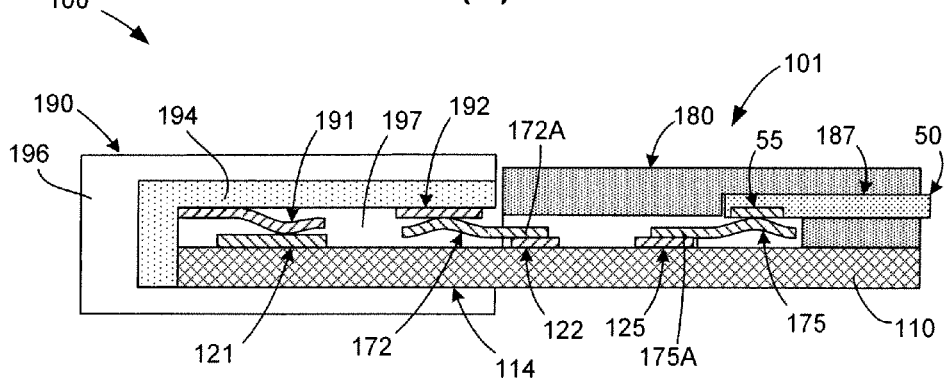

FIGS. 1(A) and 1(B) showing a dual-personality USB memory system 100 including an extended 9-pin (multiple pin) USB female socket 190 that communicates with both standard USB devices and micro-Secure-Digital (micro-SD) cards 50 by way of an extended USB dual-personality card reader 101 that is manufactured and operates in accordance with the present invention. That is, in accordance with the exemplary embodiment, dual-personality USB memory system 100 is operated to process (receive and transmit) both standard USB signals and micro-Secure-Digital (micro-SD) card signals through extended 9-pin USB socket 190 in a manner consistent with that described in co-owned U.S. Pat. No. 7,108,560, entitled "Extend USB Protocol Plug and Receptacle for implementing Single-Mode Communication", which is incorporated herein by reference.

Referring to the right side of FIG. 1(A) and FIG. 1(B), card reader 101 generally includes a printed circuit board assembly (PCBA), extended-use contact structures 172 and 175 disposed on PCBA 110, and an external housing 180. PCBA 110 includes a printed circuit board (PCB) 111 having opposing upper (first) surface 116 and an opposing lower (second) surface 118. Four standard USB (metal) contact pads 121, five extended-use (metal) contact pads 122, and eight extended-use (metal) contact pads 125 are disposed on upper surface 116. A dual-personality communication integrated circuit (IC) 130 is mounted on lower surface 118, and conductive traces (not shown) are formed on PCB 111 using known techniques such that contacts 121, 122, 125 are connected to dual-personality communication IC 130. Five extended-use contact structures 172 are disposed on upper surface 116 such that they are respectively electrically connected (e.g., soldered) to corresponding extended-use contact pads 122, and eight extended-use contact structures 175 are also disposed on upper surface 116 and respectively electrically connected to corresponding extended-use contact pads 125. External housing 180 (shown in dashed lines for illustrative purposes) is mounted over first surface 116 of PCB 111 and is arranged behind (i.e., to the right in FIG. 1(A)) of extended-use contact structures 172, whereby standard USB contact pads 121 and extended-purpose contact structures 172 are disposed outside of housing 180 and form a connector plug 114. In addition, housing 180 includes a socket (slot) 187 for removably receiving a micro-SD card (flash memory device) 50 such that each contact pad 55 of the micro-SD card 50 contacts a corresponding one of extended-use contact structures 175, thereby enabling communication between micro-SD card 50 and dual-personality communication IC 130 in the manner described below. Other features and details associated with card reader 101 are provided below.

Because many conventional USB (male) connectors and (female) sockets (also referred to as standard USB plug connectors and standard USB sockets herein) are widely deployed, it is advantageous for the improved enhanced USB connector to be compatible with standard USB sockets, and an enhanced USB socket to be compatible with standard USB connectors for backward compatibility. Although the height and width of USB connectors/sockets have to remain the same for insertion compatibility, the length of each may be extended to fit additional metal contacts for additional signals. Furthermore, additional metal contacts (pins) may be disposed on the plug connector, either adjacent to opposite the existing four standard USB metal contacts. As indicated in FIG. 1(A), plug connector 114 of card reader 101 represents such extended plug connector that includes the four standard USB metal contact pads 121 and the five additional (extended-use) contact structures 172 that are disposed in a row behind standard USB metal contact pads 121.

Referring to FIG. 1(B), to support communications with card reader 101, extended 9-pin USB female socket 190 includes four standard USB metal contact pins 191 and five additional (dual-personality) contact pads 192 that are disposed on the bottom surface of a pin substrate 194 to engage standard USB metal contact pads 121 and additional contact structures 172 when plug connector 114 is inserted therein. Female socket 190 also includes an outer (e.g., metal) casing 196 that cooperates with substrate 194 to define a cavity (slot) 197 for receiving plug connector 114. FIG. 1(B) shows plug connector 114 inserted into 9-pin USB socket 190 such that standard USB metal contact pins 191 of socket 190 contact standard USB metal contacts 121 of card reader 101, and additional contact pads 192 of socket 190 contact additional contact structures 172 of card reader 101, thereby facilitating 9-pin communication between card reader 101 and a host system controller (not shown) that is connected to socket 190.

Figure 2:
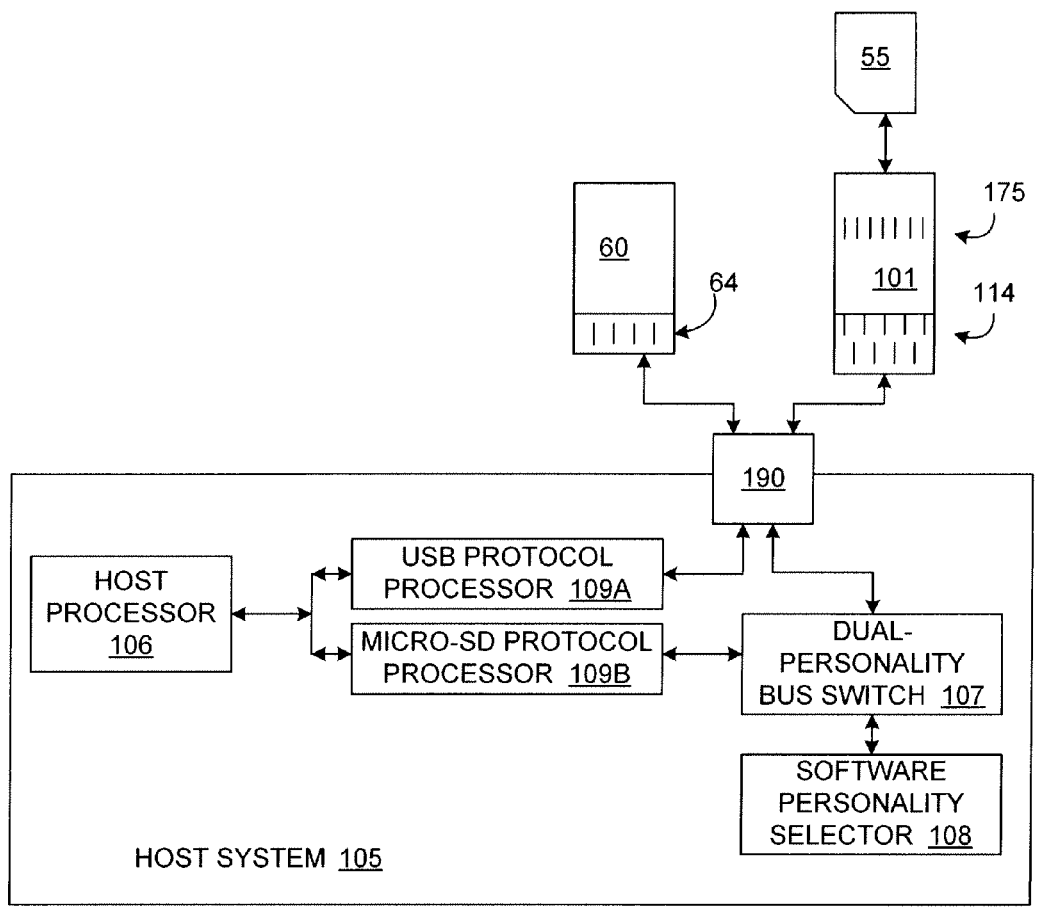
FIG. 2 is a simplified block diagram showing a host system of the dual-personality USB memory system of FIG. 1.

FIG. 2 is a block diagram of an exemplary host 105 with one embodiment of extended-USB socket 190 that supports extended-mode communication. Although the description below refers only to communications with standard USB devices 60 and micro-SD cards 55 via card reader 101, those skilled in the art will recognize that the sockets and card reader features described herein can be altered to accommodate one or more of a variety of other flash memory devices (e.g., SD, MMC, SATA, PCI-Express, Firewire IEEE 1394, or Serial-Attached SCSI). As shown in FIG. 2, host system 105 includes a processor 106 for executing programs including USB-management and bus-scheduling programs. Dual-personality serial-bus interface 107 processes data from processor 106 using two protocol processors including a standard USB protocol processor 109A and a micro-SD protocol processor 109B. USB processor 109A processes data using the USB protocol, and inputs and outputs USB data on the four standard USB contacts 191 in extended USB socket 190. The extended metal contact pins in extended USB socket 190 connect to dual-personality bus switch 107. Transceivers in dual-personality bus switch 107 buffer data to and from the transmit and receive pairs of differential data lines in the extended metal contacts for the "extended" micro-SD protocol. When an initialization routine executed by processor 106 determines that inserted flash memory device supports the micro-SD protocol, personality selector 108 configures dual-personality bus switch 107 to connect extended USB socket 190 to micro-SD processor 109B. Processor 106 communicates with micro-SD processor 109B instead of USB processor 109A when extended mode is activated. Additional details regarding the operation of host 105 will be apparent to those skilled in the art based on the teachings in U.S. Pat. No. 7,108,560 (cited above) and the description provided below.

FIGS. 3(A) and 3(B) are perspective and cross-sectional side views showing an exemplary card reader subassembly 101A including a modular USB core component 102 and a molded lead-frame connector 170. As set forth below, and with reference to the flow diagram of FIG. 4, extended USB dual-personality card readers produced in accordance with the present invention include sub-assembly 101A is manufactured by separately producing a modular core component 102 and molded lead-frame connector 170, mounting molded lead-frame connector 170 on the modular core component 102 to form sub-assembly 101A, and then mounting the sub-assembly 101A into a pre-molded external plastic housing (not shown in FIGS. 2(A) and 2(B); discussed below). By forming sub-assembly 101A in this manner, final assembly of card readers produced in accordance with the present invention using any of several external housings is greatly simplified, which reduces manufacturing costs by simplifying the assembly process.

Referring to the lower portion of FIG. 3(A), modular core component 102 generally includes a printed circuit board assembly (PCBA) 110 and a plastic housing 150 that is molded onto PCBA 110. PCBA 110 includes a printed circuit board (PCB) 111, metal contact pads 120, IC dies 130 and passive components 140. PCB 111 is a substantially flat substrate, and has opposing sides that are referred to below as upper (first) surface 116 and lower (second) surface 118. Metal contacts 120 are formed on upper surface 116, and include four standard USB metal contact pads 121 that are shaped and arranged in a pattern established by the USB specification, and two rows of extended-purpose contacts including five (first) contacts 121 and eight (second) contacts 125. IC dies 130 include (but are not limited to) a dual-personality communication IC 131, a central processing unit IC 135 and flash memory IC 137, and are electrically connected to contact pads 119 formed on lower surface 118 in the manner described below. Passive components 140 include (but are not limited to) resistor and/or capacitor components 142 and an oscillator 144, and are also connected to contact pads 119 formed on lower surface 118 in the manner described below. PCB 111 is formed in accordance with known PCB manufacturing techniques such that metal contacts 120, IC dies 130, and passive components 10 are electrically interconnected by a predefined network including conductive traces 129 and other conducting structures that are sandwiched between multiple layers of an insulating material (e.g., FR4) and adhesive.

Housing 150 is molded plastic formed and arranged such that substantially all of the plastic used to form housing 150 is located below (i.e., on one side of) PCB 111. As indicated in FIG. 3(B), housing 150 includes a peripheral surface 151 extending downward (i.e., perpendicular to PCB 111), and a lower surface 152 that extends parallel to PCB 111. For discussion purposes, the portion of peripheral surface 151 surrounding handle section 112 of PCB 111 is referred to below as handle surface section 151-1, and the section of peripheral surface 151 surrounding plug section 114 of PCB 111 is referred to below as plug surface section 151-2. Similarly, the portion of lower surface 152 covering handle section 112 of PCB 111 is referred to below as handle surface section 152-1, and the section of lower surface 152 covering plug section 114 of PCB 111 is referred to below as plug cover section 152-2.

Referring again to FIGS. 3(A) and 3(B), in accordance with another aspect of the present embodiment, molded lead-frame connector 170 of sub-assembly 101A includes five forward-facing pins 172 extending from a front edge (end) 171F of a plastic molded body 171 and have corresponding first contact pads 172A exposed through a lower surface 171B of molded body 171, and eight rear-facing pins 175 extending from a rear edge 171R of molded body 171 and have corresponding second contact pads 175A exposed through lower surface 171B. As set forth in detail below, molded lead-frame connector 170 is manufactured by forming molded plastic body 171 over contact pads 172A and 175A, and then trimming the outer ends of forward-facing pins 172 and rear-facing pins 175 from a supporting a lead-frame (not shown). As indicated in FIGS. 3(A) and 3(B), molded lead-frame connector 170 is then mounted onto upper surface 116 of PCB 111 such that each of the contact pads 172A and 175A is electrically connected (e.g., soldered) to a corresponding extended-purpose contact pad 122 or 125. By forming the molded lead-frame connector in this manner, assembly (mounting) onto the PCBA of the modular core component is greatly simplified by enabling the use of established and highly cost effective surface-mount technology (SMT) techniques.

FIG. 4(A) is an enlarged cross-sectional view showing a molded lead-frame connector 170 in additional detail, and FIG. 4(B) is a cross-sectional view showing assembly 101A.

Referring to FIG. 4(A), in accordance with another aspect of the present invention, each forward-facing pin 172 of molded lead-frame connector 170 further includes a step portion 172S extending from its contact pad 172A into plastic molded body 171. Similarly, each rear-facing pin 175 includes a step portion 175S extending from its contact pad 175 into plastic molded body 171. Step portions 172S and 175S serve to anchor forward-facing pins 172 and rear-facing pins 175 to molded body 171, thereby providing an especially strong lead-to-plastic bond that resists damage due to bending forces applied to forward-facing pins 172 and rear-facing pins 175.

As also shown in FIG. 4(A), in accordance with another aspect of the present invention, each forward-facing pin 172 of molded lead-frame connector 170 further includes a curved (bent) spring section 172C extending upward from the otherwise straight-line lead structure, and similarly, each rear-facing pin 175 includes a curved spring 175C. Curved spring sections 172C and 175C serve to facilitate good electrical contact between forward-facing pins 172 and socket 190 (see FIG. 1), and between rear-facing pins 175 and micro-SD card 50 (see FIG. 1). In particular, curved spring sections 175C are provided for contacting a micro-SD connector pin's pads. When the micro-SD device's pad is slid over a corresponding curved spring section 175C of a particular pin 175, the lead tip of the pad slides along the associated pin 175 and pushes the associated curved spring section 175C downward, thus decreasing its height due to the compressive force caused by the thickness of the micro-SD card, which is thicker than the gap between curved spring section 175C and the upper package ceiling. Thus, this slightly depressed curved spring section 175C provides an upward thrusting force that enables the micro-SD pads make good electrical contact with connector pins 175. Similarly, curved spring sections 172C of forward-facing pins 172 are provided to make good electrical contact between card reader 101 and corresponding contact pads of socket 190 (see FIG. 1).

In accordance with another aspect of the present invention, the structure (i.e., sub-assembly 101A) resulting from mounting molded lead-frame connector 170 onto modular core component 102 provides a connector plug 114 that includes the section of modular core component 102 that includes standard USB metal contact pads 121, and that extends in front of forward-facing pins 172. Note that, by forming modular core component 102 and molded lead-frame connector 170 in the manner described above, standard USB metal contact pads 121 and forward-facing pins 172 are arranged such that, when said connector plug 114 is inserted into extended multiple pin USB socket 190 (see FIG. 1(A)), each standard USB contact pad 121 contacts a corresponding standard USB contact 191 of socket 190, and each forward-facing pin 172 contacts a corresponding dual-personality contact 192 of socket 190. As set forth below, by forming sub-assembly 101A in this manner, final assembly of the card reader into any of several external housings is greatly simplified, which reduces manufacturing costs by simplifying the assembly process.

Referring to FIG. 4(B), according to another aspect of the invention, passive components 140 are mounted onto lower surface 118 using one or more standard surface mount technology (SMT) techniques, and one or more IC dies 130 are mounted using chip-on-board (COB) techniques. As indicated in FIG. 4(B), during the SMT process, the passive components, such as resistors/capacitors 142 and oscillator 144 are mounted onto associated contact pads 119 (described below) disposed on lower surface 118, and are then secured to the contact pads using known solder reflow techniques. To facilitate the SMT process, each of the passive components is packaged in any of the multiple known (preferably lead-free) SMT packages (e.g., ball grid array (BGA) or thin small outline package (TSOP)). In contrast, IC dies 130 are unpackaged, semiconductor "chips" that are mounted onto surface 118 and electrically connected to corresponding contact pads using known COB techniques. For example, as indicated in FIG. 4(B), dual IC die 130 is electrically connected to PCB 111 by way of wire bonds 160-1 that are formed using known techniques. Similarly, flash memory IC die 135 is electrically connected to PCB 111 by way of wire bonds 160-2. Passive components 142 and 144, IC dies 131 and 135 and metal contacts 120 are operably interconnected by way of metal traces 129 that are formed on and in PCB 111 using known techniques, a few of which being depicted in FIG. 3(A) in a simplified manner by short dashed lines.

Referring to FIGS. 3(B) and 4(B), a thickness T1 and width W1 of connector plug 114 is selected to produce a secure (snug) fit inside either an external case (discussed below) or directly into socket 190 (see FIG. 1).

As indicated in FIG. 4(B), according to another aspect of the present invention, housing 150 includes a planar surface 152 that is parallel to PCB 111, and defines a single plane such that a first thickness T1 of connector plug 114 (i.e., measured between upper PCB surface 116 and planar surface 152 adjacent to metal contacts 121) is substantially equal to a second thickness T2 adjacent a rear end of (i.e., measured between upper PCB surface 116 and planar surface 152 adjacent to passive component 142. That is, as indicated in FIG. 2(B), modular USB core component 102 is substantially flat along its entire length (i.e., from rear edge 151-1A to front edge 151-1B). The term "substantially flat" is meant to indicate that planar surface 152 is substantially parallel to an uppermost surface of modular USB core component 102 along its entire length. In the embodiment shown in FIG. 4(B), the uppermost surface of modular USB core component 102 is defined in part by upper surface 116 of PCB 111, which is parallel to planar surface 152 along the entire length of USB core component 102. Similarly, the term "substantially flat" is also intended to cover embodiments described below in which the housing includes a thin wall structure that is formed on or otherwise contacts the upper surface of the PCB. In these embodiments, the thickness T2 of handle structure 102 may differ by a small amount (e.g., 5% from thickness T1 of plug structure 105.

According to an aspect of the present invention, the "flatness" associated with modular USB core component 102 is achieved by mounting all of the IC dies ("chips") and other electronic components of modular USB core component 102 on lower surface 118 of PCB 111 (i.e., on the side opposite to metal contacts 121). That is, the minimum overall thickness of modular USB core component 102 is determined by the thickness T1 that is required to maintain a snug connection between connector plug 114 and female USB socket connector 190 (see FIG. 1). Because this arrangement requires that metal contacts 121 be located at the uppermost surface, and that plug wall section 151-2 plug and cover section 152-2 extend a predetermined distance below PCB 111 to provide the required thickness T1. Thus, the overall thickness of modular USB core component 102 can be minimized by mounting the IC dies 130 and 135 and passive components (e.g., capacitor 142) only on lower surface 118 of PCB 111. That is, if the IC dies and passive components are mounted on upper surface 116, then the overall thickness of the resulting USB structure would be the required thickness T1 plus the thickness that the ICs extend above PCB 111 (plus the thickness of a protective wall, if used).

According to another aspect associated with the embodiment shown in FIGS. 3(B) and 4(B), upper surface 116 of PCB 111 is entirely exposed on the upper surface of modular USB core component 102, thus facilitating the production of USB core component 102 with a maximum thickness equal to thickness T1 of plug structure 105, and also facilitating the production of sub-assembly 101A. That is, because metal contacts 120 are formed on upper surface 116, and upper surface 116 defines the higher end of required plug structure thickness T1, the overall height of modular USB core component 102 can be minimized by exposing upper surface 116 (i.e., by making any point on upper PCB surface 116 the uppermost point of modular USB core component 102). In addition, by exposing the entirety of upper surface 116, this arrangement facilitates the use of SMT techniques in the mounting of molded lead-frame connector 170 onto PCBA 110 to form sub-assembly 101A. As indicated in FIG. 4(B), in accordance with feature specifically associated with modular USB core component 102, peripheral wall 151 extends around up to but does not cover the peripheral side edges of PCB 111 (e.g., front edge 151-1B and rear edge 151-1A extend up to PCB 111, but edges 111P-2 and 111P-1 remain exposed). In an alternative embodiment (not shown), an upper edge of peripheral wall 151 may extend over the peripheral edge of PCB 111 to help prevent undesirable separation of PCBA 110 from housing 150.

Figure 5:
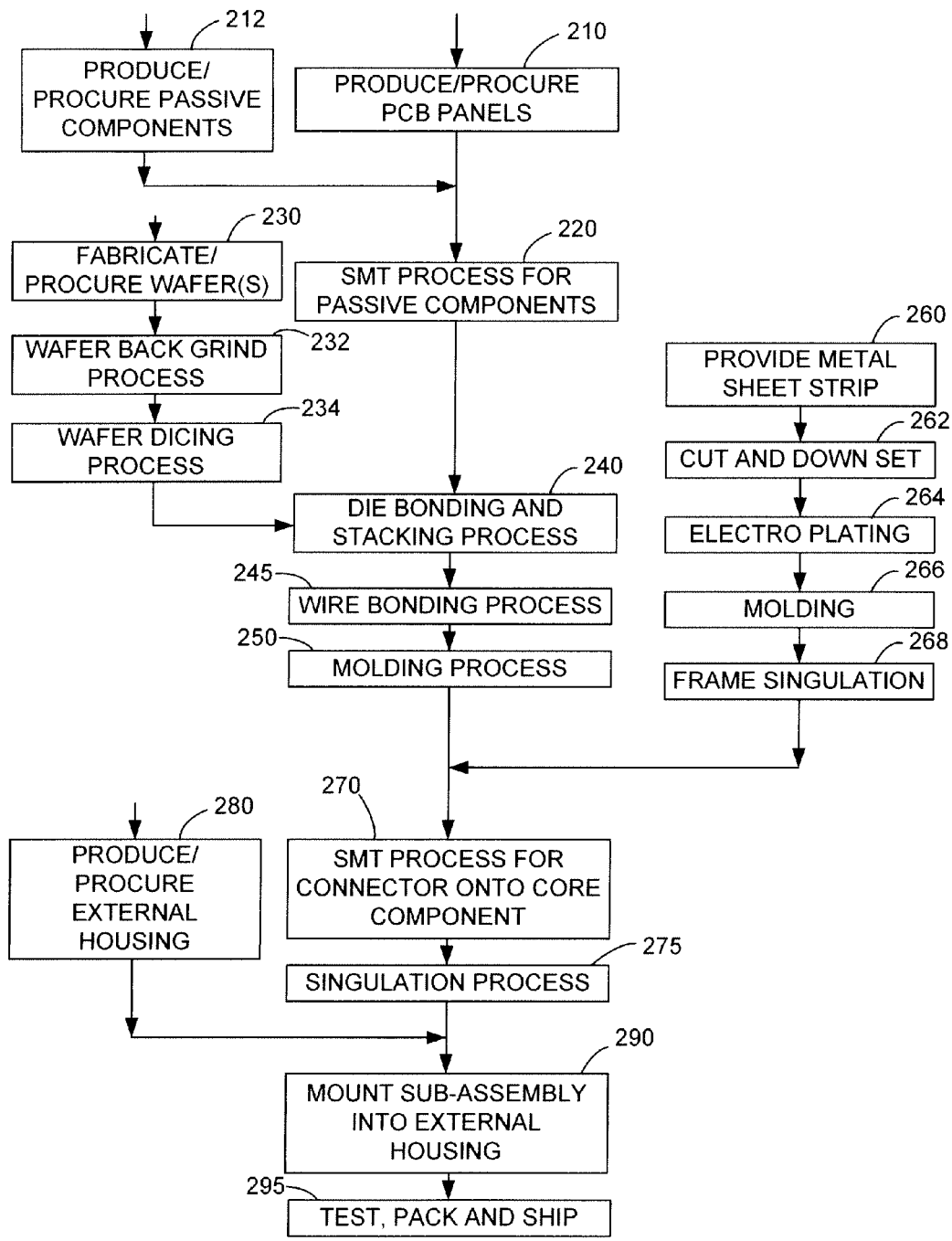
FIG. 5 is a flow diagram depicting a method for producing the extended USB dual-personality card reader of FIG. 2 according to another embodiment of the present invention.

FIG. 5 is a flow diagram showing a method for producing an extended USB dual-personality card reader according to another embodiment of the present invention. Summarizing the novel method, a panel of modular core components is fabricated (blocks 210 to 250) and individual molded lead-frame connectors are produced (blocks 260-268), the molded lead-frame connectors are then mounted onto the panel of modular core components (block 270) which is then singulated into individual sub-assemblies (block 275), which in turn are then mounted into external housings that are tested and shipped (blocks 280-295).

Referring to the upper portion of FIG. 5, the fabrication of a modular core component panel begins with generating a PCB panel using known techniques (block 210) and passive components are procured (block 212, and then passive components are mounted on the PCB panel using SMT techniques (block 220). In parallel, IC dies are produced by fabricating/procuring processed wafers (block 230), performing wafer back grind (block 232) and wafer dicing (block 234), and then the resulting IC dies are die bonded (block 240) and wire bonded (block 245) using known COB techniques onto corresponding sections of the PCB panel. Molten plastic is then used to form a molded housing over the passive components and the IC dies (block 250), thus completing the modular core component panel. This method provides several advantages over conventional manufacturing methods that utilize SMT techniques only. First, by utilizing COB techniques to mount the USB controller and flash memory, the large amount of space typically taken up by these devices is dramatically reduced, thereby facilitating significant miniaturization of the resulting USB device footprint. Second, by implementing the wafer grinding methods described below, the die height is greatly reduced, thereby facilitating stacked memory arrangements such as those described below. The molded housing also provides greater moisture and water resistance and higher impact force resistance than that achieved using conventional manufacturing methods. In comparison to the standard USB memory card manufacturing that used SMT process, it is cheaper to use the combined COB and SMT (plus molding) processes described herein because, in the SMT-only manufacturing process, the bill of materials such as Flash memory and the Controller chip are also manufactured by COB process, so all the COB costs are already factored into the packaged memory chip and controller chip. Therefore, the combined COB and SMT method according to the present invention provides a less expensive and higher quality (i.e., more reliable) card reader product with a smaller size than that possible using conventional SMT-only manufacturing methods.

Referring to the right side of FIG. 5, the molded lead-frame connectors are separately fabricated form mounting onto the core component panel. A lead-frame is produced by providing a suitable metal sheet strip (block 260), cutting and down setting the strip to form a lead frame (block 262), and then performing electroplating on the lead frame (block 264) according to known lead frame manufacturing techniques. The lead-frame is then inserted into a plastic molding machine and molded plastic bodies are formed on the lead frame (block 266). The lead frame is then cut (singulated) to provide the individual molded lead-frame connectors (block 268). Next, the molded lead-frame connectors are mounted onto the modular core component panel using SMT techniques (block 270), and the panel is then subjected to singulation (cutting) to separate the panel into individual sub-assemblies, each sub-assembly having the structure described above with reference to FIGS. 3(A), 3(B) and 4(B). This process produces sub-assemblies having high accuracy and strength, thus greatly facilitating the low-cost production of extended USB dual-personality card readers according to the present invention.

Final assembly is then performed by producing/procuring external housings (e.g., as indicated by simplified housing 180 in FIG. 1 and described in additional detail below; block 280), and each sub-assembly is mounted into an associated external housing (block 290), thereby providing completed extended USB dual-personality card readers. Each extended USB dual-personality card reader is tested, packed and shipped (block 295) according to customary practices.

The flow diagram of FIG. 5 will now be described in additional detail below with reference to the following figures.

Referring to the upper portion of FIG. 5, the manufacturing method begins with filling a bill of materials including producing/procuring PCB panels (block 210), producing/procuring passive (discrete) components (block 212) such as resistors, capacitors, diodes, LEDs and oscillators that are packaged for SMT processing, and producing/procuring a supply of IC wafers (or individual IC dies).

Figure 6A:
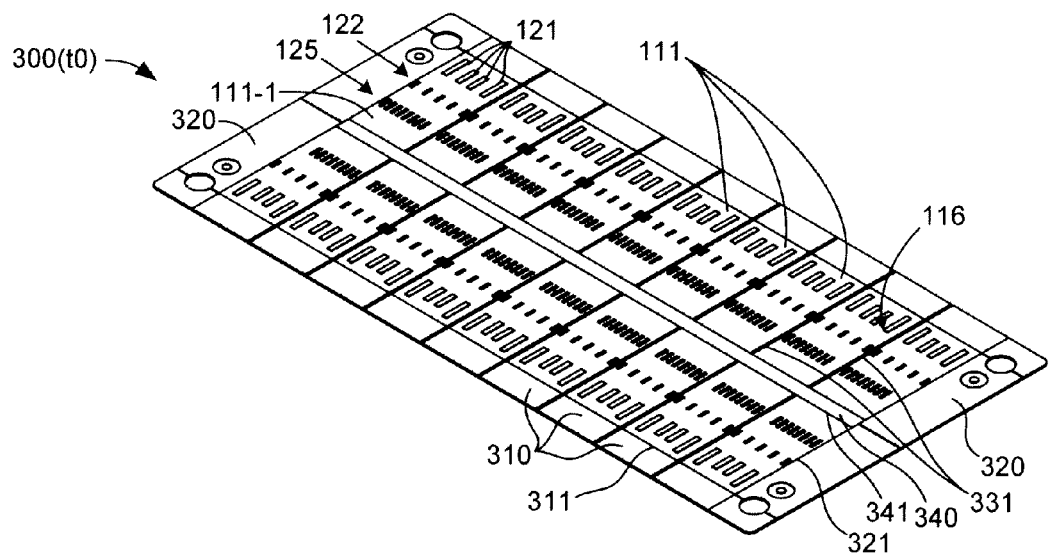
FIGS. 6(A) and 6(B) are top perspective and partial bottom perspective views showing a PCB panel utilized in the method of FIG. 5.
Figure 6B:
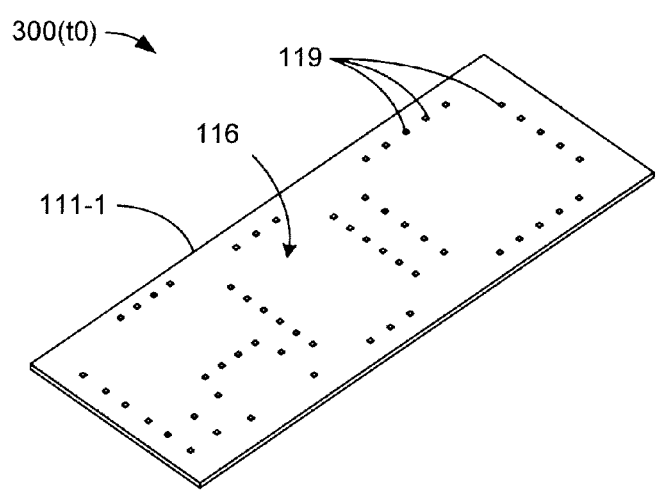

FIG. 6(A) is a top perspective view showing a PCB panel 300(t0) provided in block 210 of FIG. 3 according to a specific embodiment of the present invention. FIG. 6(B) is a bottom perspective view showing one PCB 111 of PCB panel 300(t0). The suffix "tx" is utilized herein to designated the state of the PCB panel during the manufacturing process, with "t0" designating an initial state. Sequentially higher numbered prefixes (e.g., "t1", "t2" and "t3") indicate that PCB panel 300 has undergone additional processing.

As indicated in FIG. 6(A), PCB panel 300(t0) includes a two-by-nine matrix of regions designated as PCBs 111, each having the features described above with reference to FIG. 3(A). FIG. 6(A) shows upper surface 116 of each PCB 111 (e.g., upper surface 116 of panel 111-1 includes metal contacts 121, 122 and 125, described above), and FIG. 6(B) shows lower surface 118 of PCB 111-1. Note that lower surface 118 of each PCB 111 (e.g., PCB 111-1) includes multiple contact pads 119 arranged in predetermined patterns for facilitating SMT and COB processes, as described below.

As indicated in FIG. 6(A), in addition to the two rows of PCBs 111, panel 300(t0) includes end border regions 310 and side border regions 320 that surround the PCBs 111, and a central region 340 disposed between the two rows of PCBs 111. Designated cut lines are scored or otherwise partially cut into PCB panel 300(t0) along the borders of each of these regions, but do not pass through the panel material. For example, end cut lines 311 separate end border panels 310 from associated PCBs 111, side cut lines 321 separate side border panels 310 from associated PCBs 111, and central cut lines 341 separate central region 340 from associated PCBs 111. PCB cut lines 331 are formed along the side edges between adjacent PCBs 111. The border panels are provided with positioning holes and other features known to those skilled in the art to facilitate the manufacturing process, and are removed during singulation (described below).

Note that PCBs for USB devices that are produced using SMT-only manufacturing processes must be significantly wider than PCBs 111 due to the space required to mount already packaged flash memory devices. As such, PCB panels for SMT-only manufacturing methods typically include only twelve PCBs arranged in a 2×6 matrix. By utilizing COB methods to mount the flash memory, the present invention facilitates significantly narrower PCB 111, thereby allowing each PCB panel 300(t0) to include 18 PCBs 111 arranged in a 2×9 matrix. By increasing the number of PCBs 111 per PCB panel, the present invention provides shorter manufacturing time and hence lower cost.

Figure 7A:
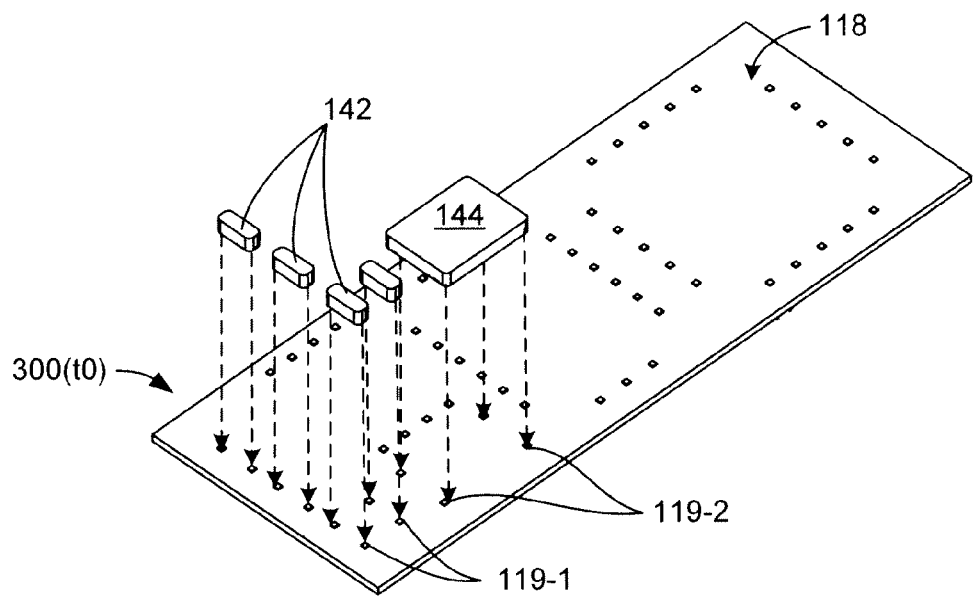
FIGS. 7(A) and 7(B) are bottom perspective views showing a PCB of the PCB panel of FIG. 6(A) during and after the SMT process.
Figure 7B:
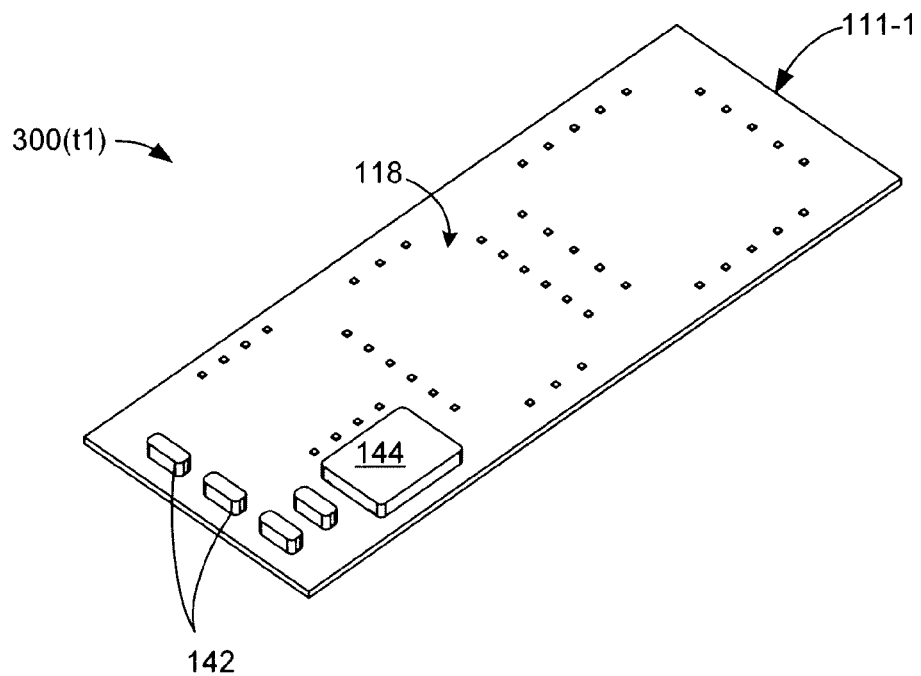

FIG. 7(A) is a perspective view depicting a portion of panel 300(t0) that is used to mount passive components on PCB 111-1 according to block 220 of FIG. 5. During the first stage of the SMT process, lead-free solder paste is printed on contact pads 119-1 and 119-2, which in the present example correspond to SMT components 142 and 144, using custom made stencil that is tailored to the design and layout of PCB 111-1. After dispensing the solder paste, the panel is conveyed to a conventional pick-and-place machine that mounts SMT components 142 and 144 onto contact pads 119-1 and 119-2, respectively, according to known techniques. Upon completion of the pick-and-place component mounting process, the PCB panel is then passed through an IR-reflow oven set at the correct temperature profile. The solder of each pad on the PC board is fully melted during the peak temperature zone of the oven, and this melted solder connects all pins of the passive components to the finger pads of the PC board. FIG. 7(B) shows PCB 111-1 of the resulting PCB panel 300(t1), which now includes passive components 142 and 144 mounted thereon by the completed SMT process.

Figure 8A:
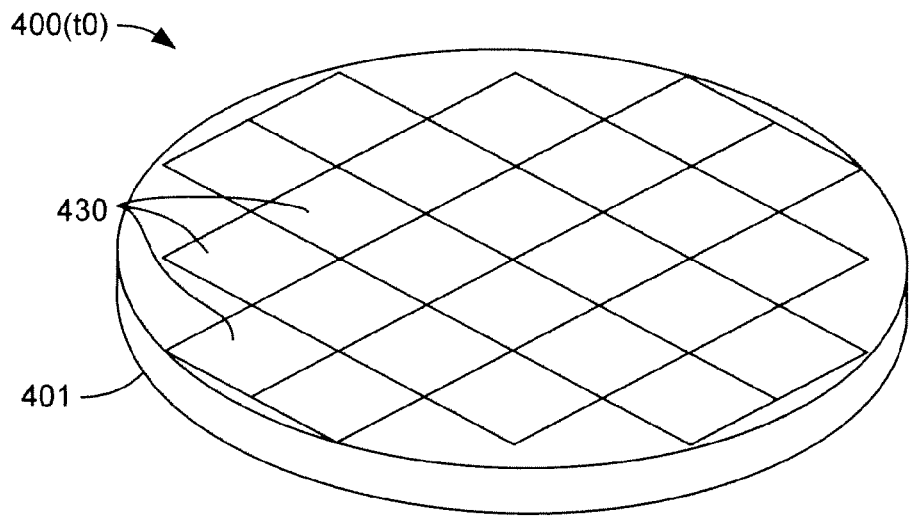
FIGS. 8(A), 8(B), 8(C) and 8(D) are simplified perspective and cross-sectional side views depicting a semiconductor wafer and a process of grinding and dicing the wafer to produce IC dies utilized in the method of FIG. 5.

FIG. 8(A) is a simplified perspective view showing a semiconductor wafer 400(t0) procured or fabricated according to block 230 of FIG. 5. Wafer 400(t0) includes multiple ICs 430 that are formed in accordance with known photolithographic fabrication (e.g., CMOS) techniques on a semiconductor base 401. In the example described below, wafer 400(t1) includes ICs 430 that comprise, e.g., dual-personality communication ICs. In a related procedure, a wafer (not shown) similar to wafer 400(t1) is produced/procured that includes flash memory circuits, and in an alternative embodiment (described in additional detail below), ICs 430 may include both dual-personality communication ICs and flash memory circuits. In each instance, these wafers are processed as described herein with reference to FIGS. 8(B), 8(C) and 8(D).

Figure 8B:
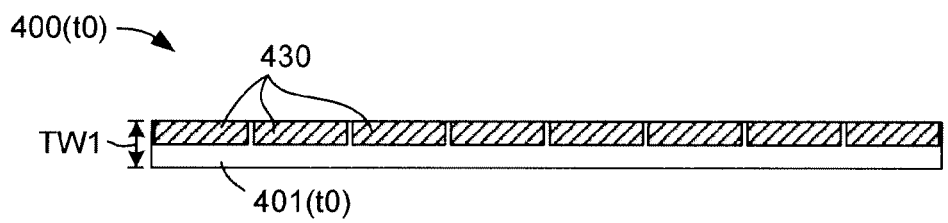
Figure 8C:
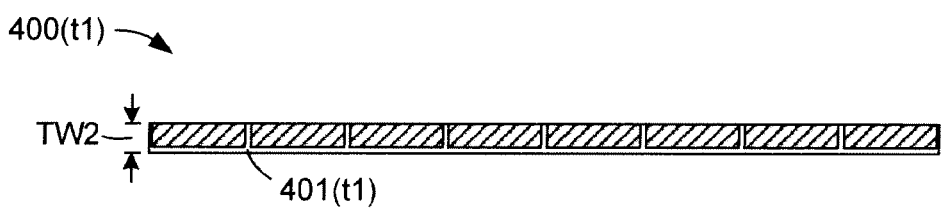

As indicated in FIGS. 8(B) and 8(C), during a wafer back grind process according to block 232 of FIG. 5, base 401 is subjected to a grinding process in order to reduce the overall initial thickness TW1 of each IC 430. Wafer 400(t1) is first mount face down on sticky tape (i.e., such that base layer 401(t0) faces away from the tape), which is pre-taped on a metal or plastic ring frame (not shown). The ring-frame/wafer assembly is then loaded onto a vacuum chuck (not shown) having a very level, flat surface, and has diameter larger than that of wafer 400(t0). The base layer is then subjected to grinding until, as indicated in FIG. 8(C), wafer 400(t1) has a pre-programmed thickness TW2 that is less than initial thickness TW1 (shown in FIG. 8(B)). The wafer is cleaned using de-ionized (D1) water during the process, and wafer 400(t1) is subjected to a flush clean with more D1 water at the end of mechanical grinding process, followed by spinning at high speed to air dry wafer 400(t1).

Figure 8D:
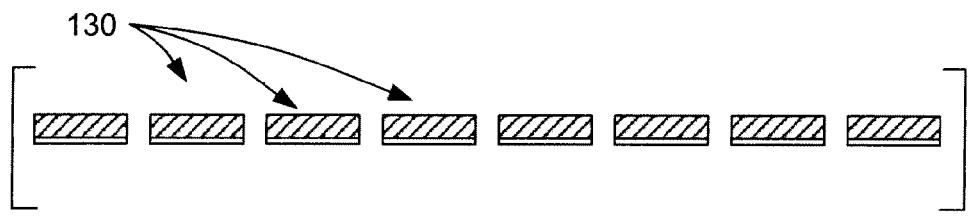

Next, as shown in FIG. 8(D), the wafer is diced (cut apart) along predefined border regions separating ICs 430 in order to produce IC dies 130 according to block 234 of FIG. 5. After the back grind process has completed, the sticky tape at the front side of wafer 400(t1) is removed, and wafer 400(t1) is mounted onto another ring frame having sticky tape provided thereon, this time with the backside of the newly grinded wafer contacting the tape. The ring framed wafers are then loaded into a die saw machine. The die saw machine is pre-programmed with the correct die size information, X-axis and Y-axis scribe lanes' width, wafer thickness and intended over cut depth. A proper saw blade width is then selected based on the widths of the XY scribe lanes. The cutting process begins dicing the first lane of the X-axis of the wafer. De-ionized wafer is flushing at the proper angle and pressure around the blade and wafer contact point to wash and sweep away the silicon saw dust while the saw is spinning and moving along the scribe lane. The sawing process will index to the second lane according to the die size and scribe width distance. After all the X-axis lanes have been completed sawing, the wafer chuck with rotate 90 degree to align the Y-axis scribe lanes to be cut. The cutting motion repeated until all the scribe lanes on the Y-axis have been completed.

Figure 9A:
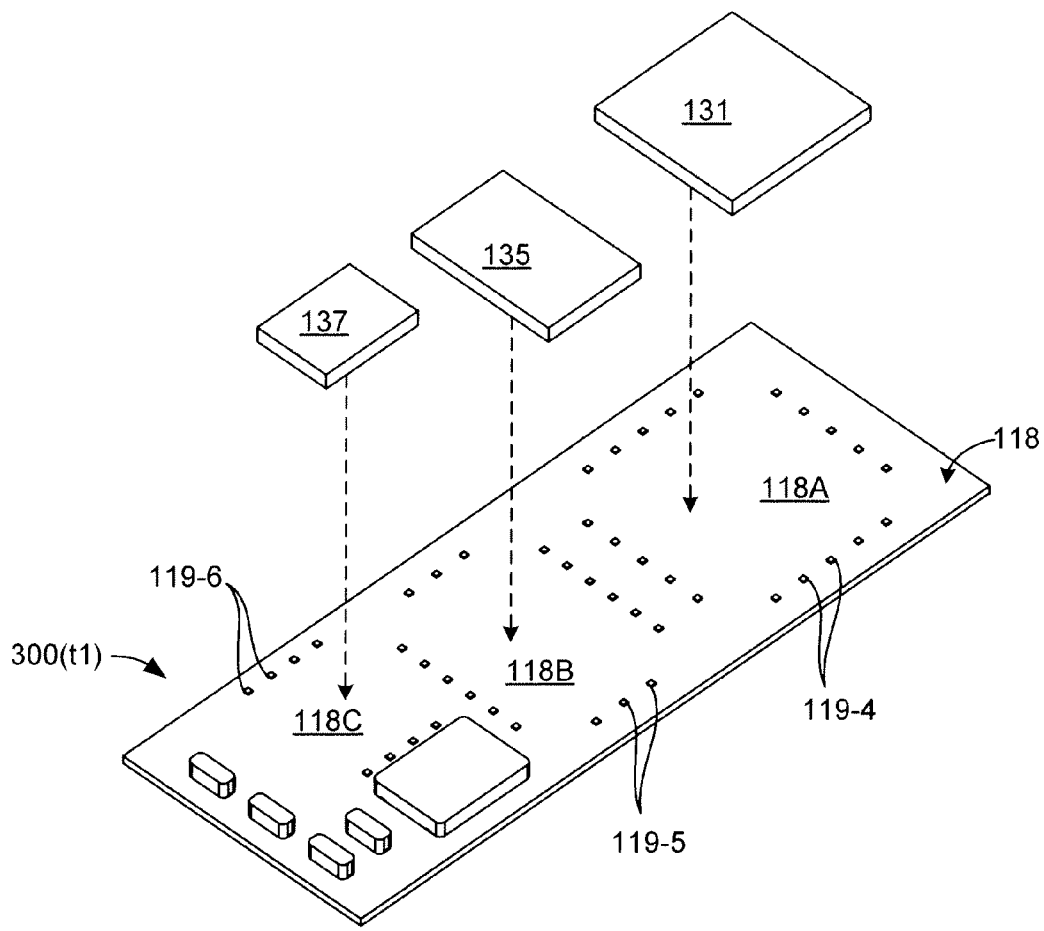
FIGS. 9(A) and 9(B) are perspective views depicting a die bonding process utilized to mount the IC dies of FIG. 8(D) on a PCB according to the method of FIG. 5.
Figure 9B:
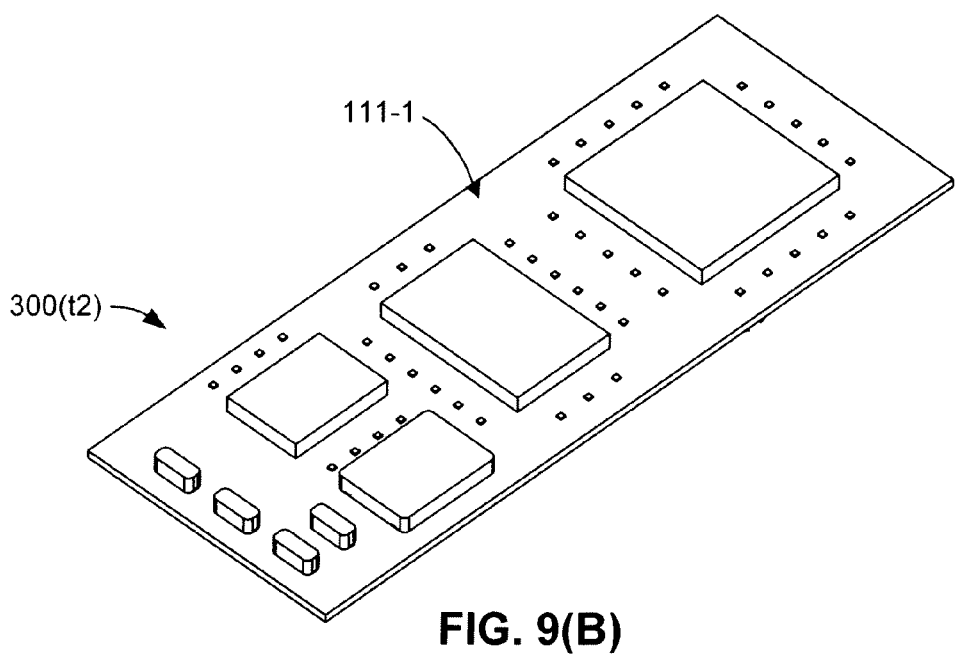

FIG. 9(A) is a perspective view depicting a die bonding process utilized to mount IC dies 131, 135 and 137 on PCB 111-1 of the PCB panel 300(t1) (described above with reference to FIG. 7(B)) according to block 240 of FIG. 5. The die bonding process generally involves mounting IC dies 131 into lower surface region 118A, which is surrounded by contact pads 119-4, mounting IC die 135 into lower surface region 118B, which is surrounded by contact pads 119-5, and mounting IC die 137 into lower surface region 118C, which is surrounded by contact pads 119-6. In one specific embodiment, an operator loads IC dies 131, 135 and 137 onto a die bonder machine according to known techniques. The operator also loads multiple PCB panels 300(t1) onto the magazine rack of the die bonder machine. The die bonder machine picks the first PCB panel 300(t1) from the bottom stack of the magazine and transports the selected PCB panel from the conveyor track to the die bond (DB) epoxy dispensing target area. The magazine lowers a notch automatically to get ready for the machine to pick up the second piece (the new bottom piece) in the next cycle of die bond operation. At the die bond epoxy dispensing target area, the machine automatically dispenses DB epoxy, using pre-programmed write pattern and speed with the correct nozzle size, onto the target areas 118A, 118B and 118C of each of the PCB 111 of PCB panel 300(t1). When all PCBs 111 have completed this epoxy dispensing process, the PCB panel is conveyed to a die bond (DB) target area. Meanwhile, at the input stage, the magazine is loading a second PCB panel to this vacant DB epoxy dispensing target area. At the die bond target area, the pick up arm mechanism and collet (suction head with rectangular ring at the perimeter so that vacuum from the center can create a suction force) picks up an IC die 131 and bonds it onto area 118A, where epoxy has already dispensed for the bonding purpose, and this process is then performed to place IC dies 135 and 137 into regions 118B and 118C. Once all the PCB boards 111 on the PCB panel have completed die bonding process, the PCB panel is then conveyed to a snap cure region, where the PCB panel passes through a chamber having a heating element that radiates heat having a temperature that is suitable to thermally cure the epoxy. After curing, the PCB panel is conveyed into the empty slot of the magazine waiting at the output rack of the die bonding machine. The magazine moves up one slot after receiving a new panel to get ready for accepting the next panel in the second cycle of process. The die bonding machine will repeat these steps until all of the PCB panels in the input magazine are processed. This process step may repeat again for the same panel for stack die products that may require to stacks more than one layer of memory die. FIG. 9(B) is a top perspective views showing PCB 111-1 of PCB panel 300(t2) after the die bonding process is completed.

Figure 10A:
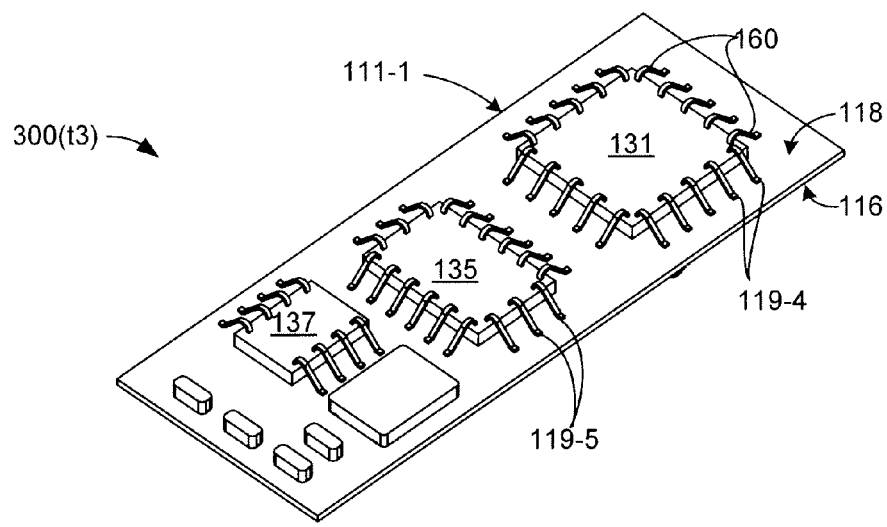
FIGS. 10(A) and 10(B) are perspective views depicting a wire bonding process utilized to connect the IC dies to corresponding contact pads disposed on the PCB of FIG. 9(B) according to the method of FIG. 5.
Figure 10B:
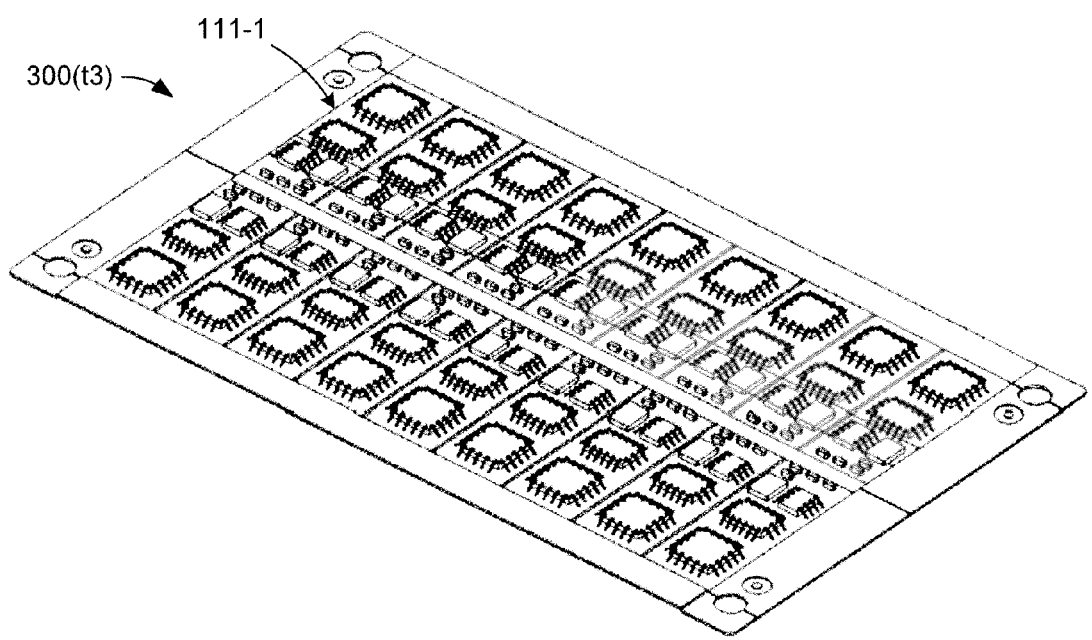

FIG. 10(A) is a perspective view depicting a wire bonding process utilized to connect the IC dies 131, 135 and 137 to corresponding contact pads 119-4, 119-5 and 119-6, respectively, according to block 245 of FIG. 5. The wire bonding process proceeds as follows. Once a full magazine of PCB panels 300(t2) (see FIG. 9(B)) has completed the die bonding operation, an operator transports the PCB panels 300(t2) to a nearby wire bonder (WB) machine, and loads the PCB panels 300(t2) onto the magazine input rack of the WB machine. The WB machine is pre-prepared with the correct program to process this specific USB device. The coordinates of all the ICs, pads 119-4, 119-5 and 119-6 and PCB gold fingers were previously determined and programmed on the WB machine. After the PCB panel with the attached dies is loaded at the WB bonding area, the operator commands the WB machine to use optical vision to recognize the location of the first wire bond pin of the first memory die of the first PCB on the panel. Once the first pin is set correctly, the WB machine can carry out the whole wire bonding process for the rest of the panels of the same product type automatically. For multiple flash layer stack dies, the PCB panels may be returned to the WB machine to repeat wire bonding process for the second stack. FIG. 10(B) is a top perspective views showing PCB panel 300(t3) after the wire bonding process is completed.

Figure 11A:
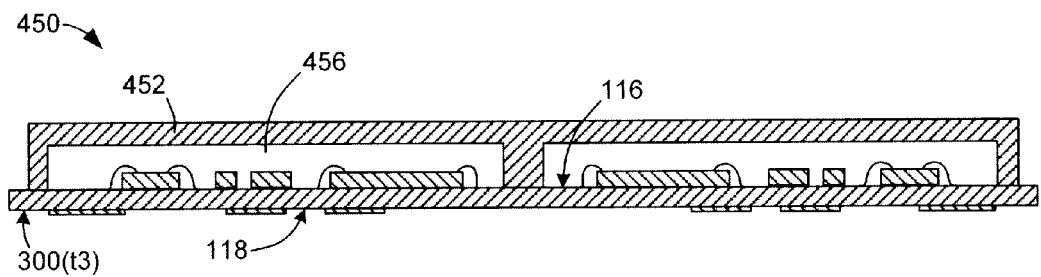
FIGS. 11(A) and 11(B) are simplified cross-sectional side views depicting a molding process for forming a molded housings over the PCB panel according to the method of FIG. 5.
Figure 11B:
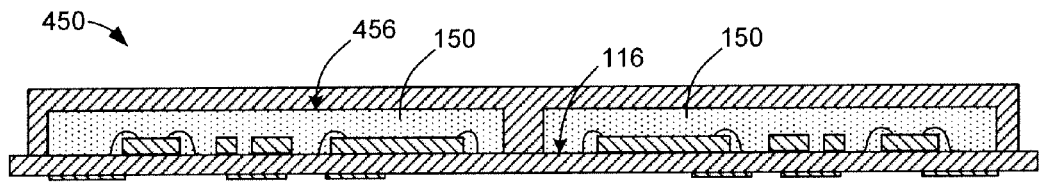
Figure 12:
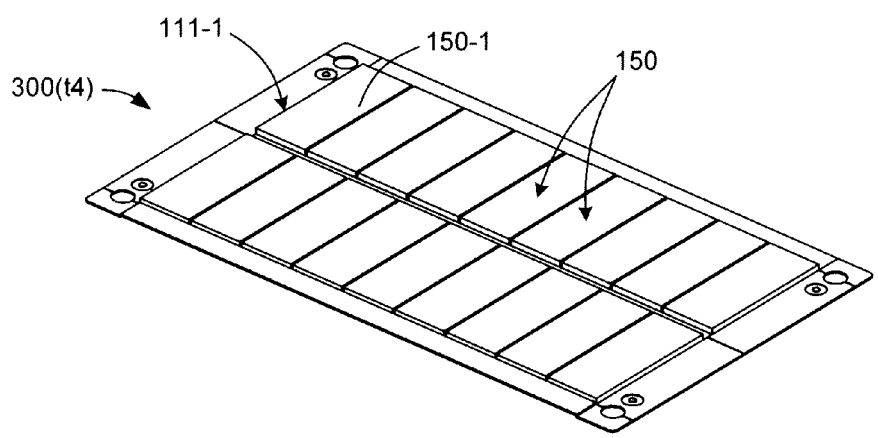
FIG. 12 is a top perspective views showing the PCB panel after the molding process is completed.

FIGS. 11(A) and 11(B) are simplified cross-sectional side views depicting a molding process for forming a molded housing layer over PCB panel 300(t3) according to block 250 of FIG. 5. As indicated in FIG. 11(A), after the wire bonding process is completed, USB panel 300(t3) is loaded into a mold machine 450 including a cover plate 452 that mounts onto lower surface 116 of PCB panel 300(t3), and defines a chamber 456 that is disposed over the IC chips, wire bonds and passive components that are mounted on lower surface 116 of each PCB. Note that no molding material is applied to upper surface 118. Transfer molding is prefer here due to the high accuracy of transfer molding tooling and low cycle time. The molding material in the form of pellet is preheated and loaded into a pot or chamber (not shown). As depicted in FIG. 11(B), a plunger (not shown) is then used to force the material from the pot through channels known as a spruce and runner system into the mold cavity 456, causing the molten (e.g., plastic) material to form molded casings 150 over each PCB that encapsulates all the IC chips and components, and to cover all the exposed areas of upper surface 116. The mold remains closed as the material is inserted and filled up all vacant in cavity 456. During the process, the walls of cover plate 452 are heated to a temperature above the melting point of the mold material, which facilitates a faster flow of material through cavity 456. Mold machine 450 remains closed until a curing reaction within the molding material is complete. A cooling down cycle follows the injection process, and the molding materials of molded casings 150 start to solidify and harden. Ejector pins push PCB panel 300(t4) (shown in FIG. 12) from the mold machine once molded casings 150 has hardened sufficiently.

Figure 13A:
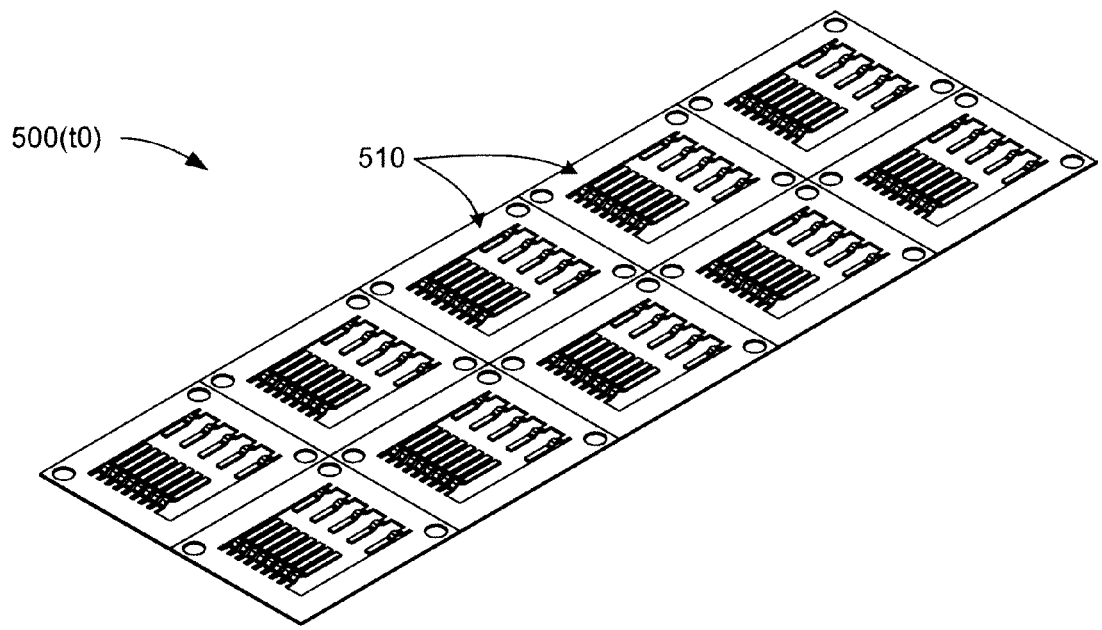
FIGS. 13(A) and 13(B) are perspective views showing a lead frame panel and a lead frame of the panel, respectively, that are used to produce molded lead-frame connectors according to the method of FIG. 5.
Figure 13B:
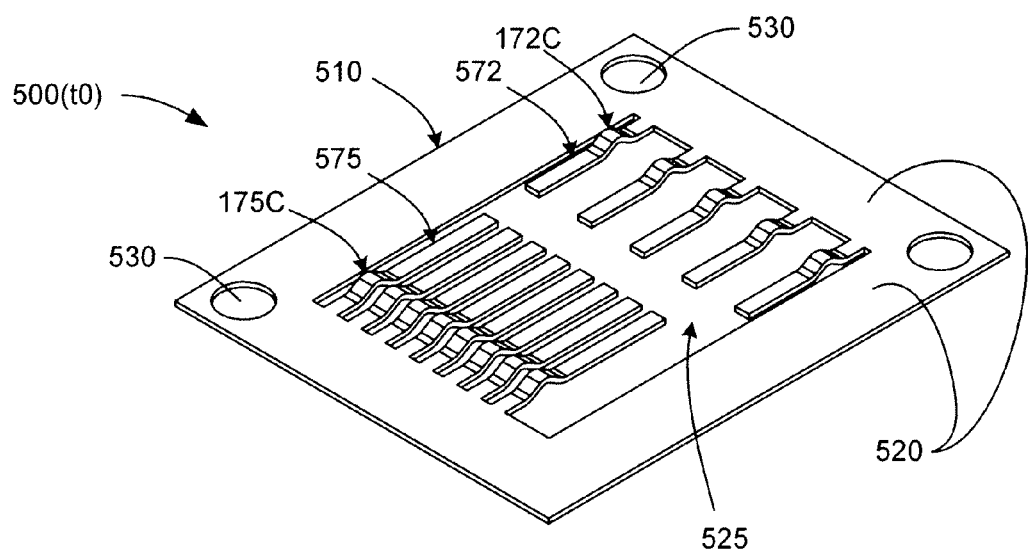

Referring again to blocks 260-268 of FIG. 5, the fabrication of molded lead-frame connectors (e.g., connector 170; see FIG. 3(A)) is now described with reference to FIGS. 13(A) through 14(B). Each lead frame begins as a continuous stripe of copper or alloy sheet metal (block 260; FIG. 5) that is then cut and down set using known techniques to produce lead frame panel 500(t0), which is shown in FIG. 13(A). Lead frame panel 500(t0) includes ten lead frames 510 arranged in two rows of five. As indicated in FIG. 13(B), each lead frame 510 includes a four-sided metal frame 520 surrounding a central opening 525, with five leads 572 and eight 575 extending from opposite portions of metal frame 520 into central region 525. Note that the cut and down set process is controlled using known techniques to produce bumps 172C and 175C in each of the leads, and also to provide the raised step-like regions such as those described above at the free ends of each lead. The leads 572 and 575 are then electroplated with a thin layer of nickel and gold for preventing corrosion and ensuring good (low) contact resistance for providing good electrical contact. Round index holes 530 are provided during the cutting process for machine recognition and alignment purposes for down stream processes. Metal frame 530 serves to hold leads contactor pins in place during the subsequent plastic molding process.

Figure 14A:
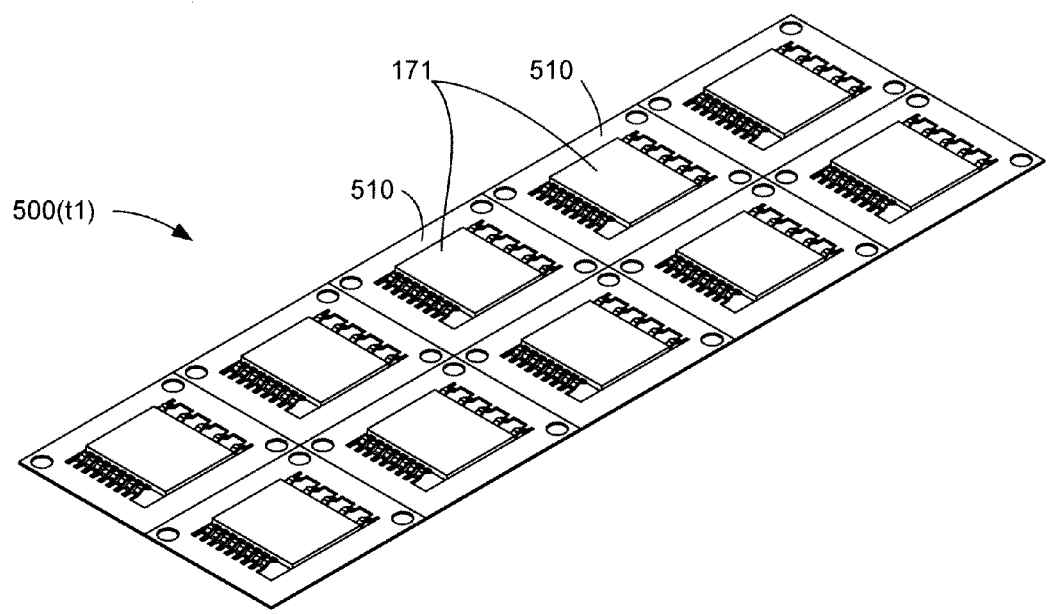
FIGS. 14(A) and 14(B) are perspective views showing the lead frame panel and the lead frame of FIGS. 15(A) and 15(B), respectively, after a molded body is formed on ends of the leads.
Figure 14B:
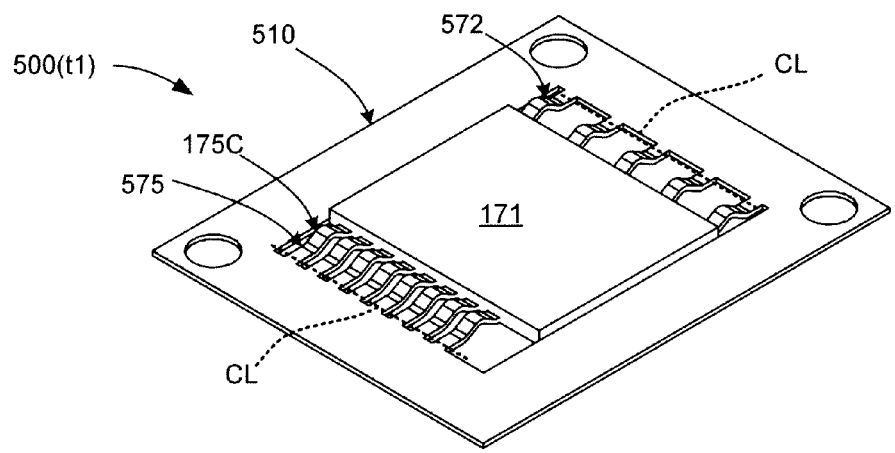

Referring to FIGS. 14(A) and 14(B), lead frame panel 500(t0) is then loaded into a transfer mold machine similar to that described above with reference to FIGS. 11(A) and 11(B) such that the free ends of each lead is received inside the molding chamber and is encapsulated into the thermo set plastic material, thereby forming lead frame panel 500(t1) having molded bodies 171 in the middle section of each lead frame 510. Note that the base portion of each lead including its bent portion (e.g., portion 172C of each lead 575) remains outside of the molding chamber, and as such extends form molded body 171. Molded lead frame panel 500(t1) is then moved to a singulation station to have the pins and the metal frames 510 separated along cut lines CL on each row of the panel. The resulting individual molded lead-frame connectors 170 are described above with reference to FIGS. 3(A) and 4(A).

Figure 15A:
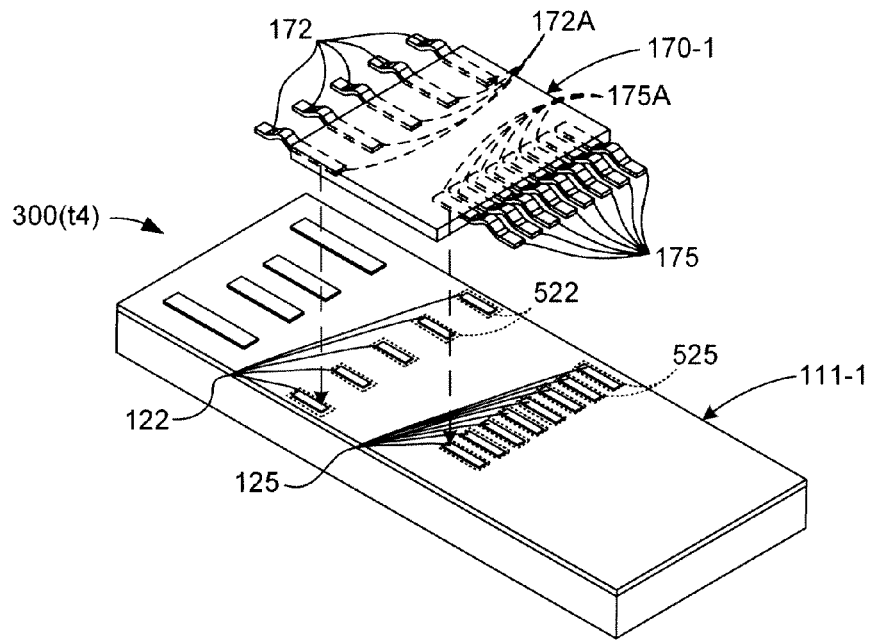
FIGS. 15(A) and 15(B) an exploded perspective view showing a PCB and a PCB panel, respectively, depicting an SMT process utilized to mount the lead-frame connectors of FIG. 14(B) on PCBs according to the method of FIG. 5.
Figure 15B:
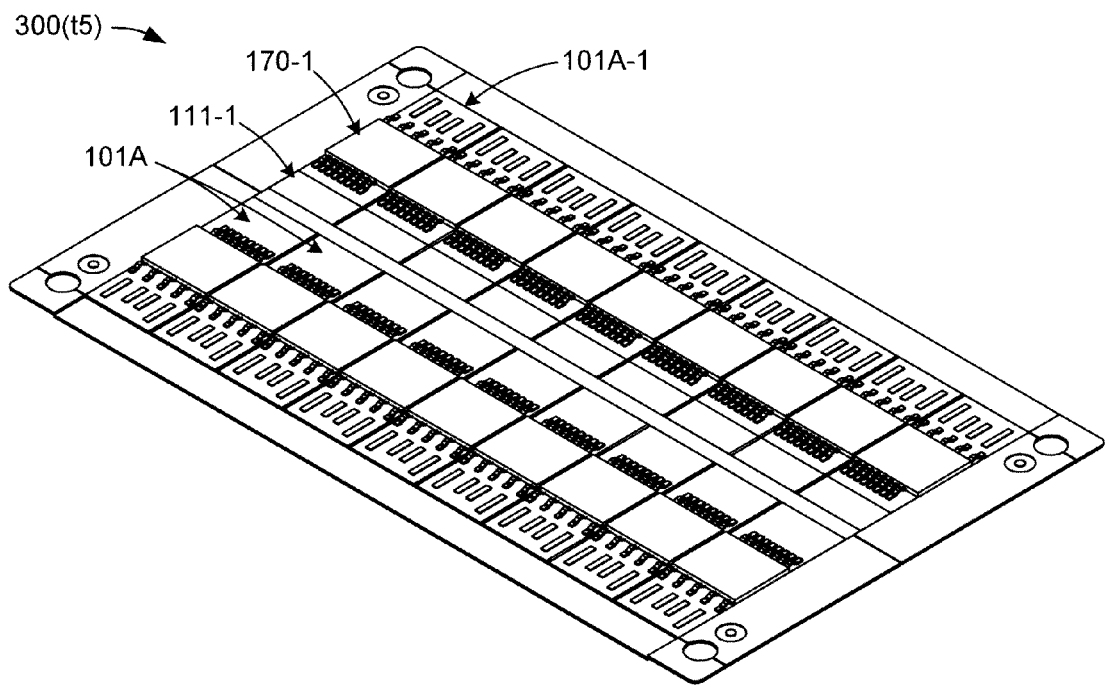

FIGS. 15(A) and 15(B) show the subsequent process, in accordance with block 270 of FIG. 5, of mounting molded lead-frame connectors 170 (e.g., connector 170-1) onto corresponding PCBs (e.g., PCB 111-1) of PCB panel 300(t4) using SMT techniques, which has been processed as described above with reference to FIG. 12. During this SMT mounting process, lead-free solder paste portions 522 and 525 are printed onto each of contact pads 122 and 125, respectively, of each PCB on panel 300(t4) using a conventional stencil printer machine. A pick-and-place machine (not shown) then picks up and mounts lead-frame connector 170-1 on PCB 111-1 with precise alignment such that the associated contact pad 172A of each contact pin 172 is mounted onto a corresponding contact pad 122, and such that the associated contact pad 175A of each pin 175 is mounted onto a corresponding contact pad 125. The surface mount process is then repeated for each PCB 111 of panel 300(t4). The panel with lead-frame connectors mounted thereon is then send through a standard IR-reflow oven, which has the proper temperature of each temperature zone set correctly prior to the start of the process, to complete the SMT process. FIG. 15(B) shows PCB panel 300(t5) including subassemblies 101A, including sub-assembly 101A-1 having lead-frame connector 170-1 mounted on PCB 111-1.

Figure 16:
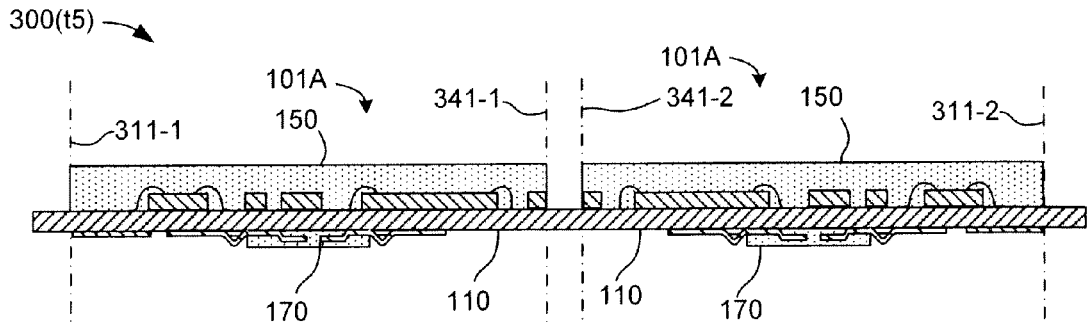
FIG. 16 is a cross-sectional side view showing a singulation process according to the method of FIG. 5.

FIG. 16 is simplified cross-sectional side view depicting a singulation process according to block 275 of FIG. 5 that is used to separate PCB panel 300(t5) into individual sub-assemblies 101A. PCB panel 300(t5) is loaded into a saw machine (not shown) that is pre-programmed with a singulation routine that includes predetermined cut locations. The saw blade is aligned to the first cut line (e.g., end cut line 311-1) as a starting point by the operator. The coordinates of the first position are stored in the memory of the saw machine. The saw machine then automatically proceeds to cut up (singulate) the USB pane 300(t5), for example, successively along cut lines 311-1, 341-1, 341-2, and 311-2, and then along the side cut lines and PCB cut lines (see FIG. 5(A)) to form individual sub-assemblies 101A, which are shown and described above with reference to FIGS. 3(A) and 3(B), according to the pre-programmed singulation routine.

Figure 17:
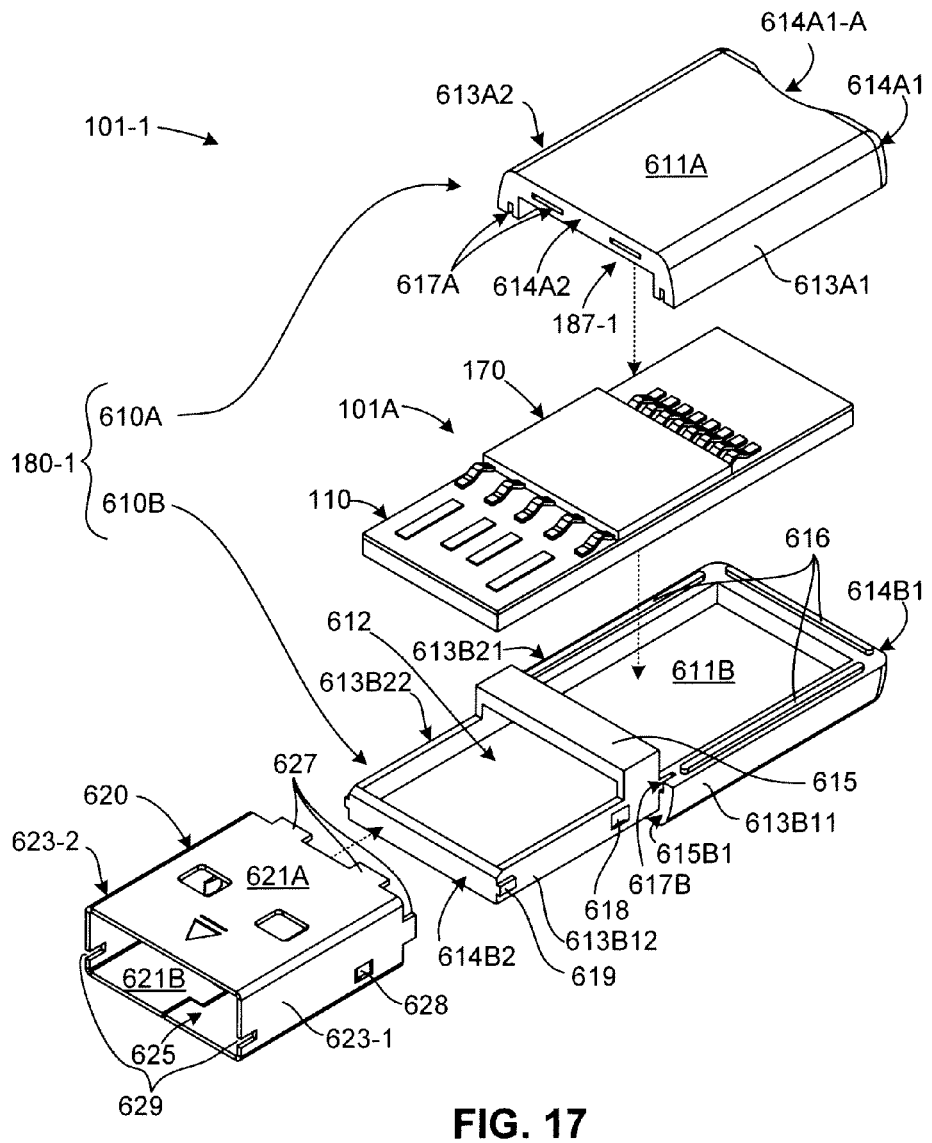
FIG. 17 is an exploded perspective view showing a card reader according to an embodiment of the present invention.

FIG. 17 is an exploded perspective view showing an extended Universal-Serial-Bus (USB) dual-personality card reader 101-1 according to a first specific embodiment that includes sub-assembly 101A (described above), an external housing 180-1, and a metal USB connector head cover (plug shell) 620. Housing 180-1 is produced or procured in accordance with block 280 of FIG. 5, and sub-assembly 101A is mounted inside housing 180-1 in accordance with block 290 of FIG. 5. Both housing 180-1 and the process of mounting sub-assembly 101A inside housing 180-1 are described in the following paragraphs with reference to FIGS. 17-22.

Housing 180-1 includes an upper top cover housing portion 610A and a lower main body housing portion 610B that are pre-molded plastic structures formed using known techniques. The term "pre-molded" is used herein to indicate that top cover 610A and lower housing portion 610B are an integral molded structures formed during separate (e.g., injection) plastic molding processes that are performed prior to assembly.

Referring to the upper portion of FIG. 17, top cover 610A includes an upper wall 611A, opposing side walls 613A1 and 613A2, a rear wall 614A1 defining a slot opening 614A1-A that communicated with an internal chamber (slot) 187-1, and a front surface 614A2. Locking grooves 617A are defined on front surface 614A2 of upper wall 611A and side walls 613A1 and 613A2 for receiving tabs 627 extending from head cover 620. Although not shown, lower surfaces of side walls 613A1 and 613A2 and rear wall 614A1 define grooves for snap-coupling top cover 610A to lower housing portion 610B in the manner described below.

Referring to the lower portion of FIG. 17, lower housing portion 610B includes a lower wall 611B, opposing side walls including wide rear portions 613B11 and 613B21 and opposing narrow front portions 613B12 and 613B22, a rear wall 614B1 and a front wall 614B2. Lower wall 611B, side walls 613B11, 613B21, 613B12 and 613B22, rear wall 614B1 and front wall 614B2 define a trough 612 for receiving sub-assembly 101A. A raised collar structure 615 is integrally molded to side walls 613B11 and 613B21, and extends between the opposing side wall over trough 612. Locking ribs 616 extend upward from upper edge surfaces of side wall portions 613B11 and 613B21 and rear wall 614B1, and serve to snap-couple top cover 610A to lower housing portion 610B as described below. Locking grooves 617B are defined on front surface 614B1 of side wall portions 613B11 and 613B21 for receiving corresponding tabs 627 extending from head cover 620. Notches 618 are defined on side wall portions 613B11 and 613B21 for receiving corresponding bumps 628 extending from side walls 623-1 an 623-2 of head cover 620. Protrusions 619 extend from the front ends of side wall portions 613B11 and 613B21 for engaging corresponding notches 629 defined in side walls 623-1 an 623-2 of head cover 620.

Head cover 620 is a folded metal sheet that extends over and becomes coupled to lower housing portion 610B in the manner described below. Head cover includes opposing upper and lower walls 621A and 621B that are held by opposing side walls 623-1 and 623-2, and are sized to slip tightly over the front end of lower housing portion 610B (i.e., such that lower wall 621B is disposed under lower wall 611B, and a rear portion of upper wall 621A is mounted on the upper surface of raised collar structure 615). Upper wall 621A includes openings and markings that are consistent with standard USB plug shell structures. Side walls 623-1 and 623-2 include bumps 628 and notches 629 whose purpose is described below. In addition, tabs 627 extend from a rear edge of upper and lower walls 621A and 621B and side walls 623-1 and 623-2.

Figure 18A:
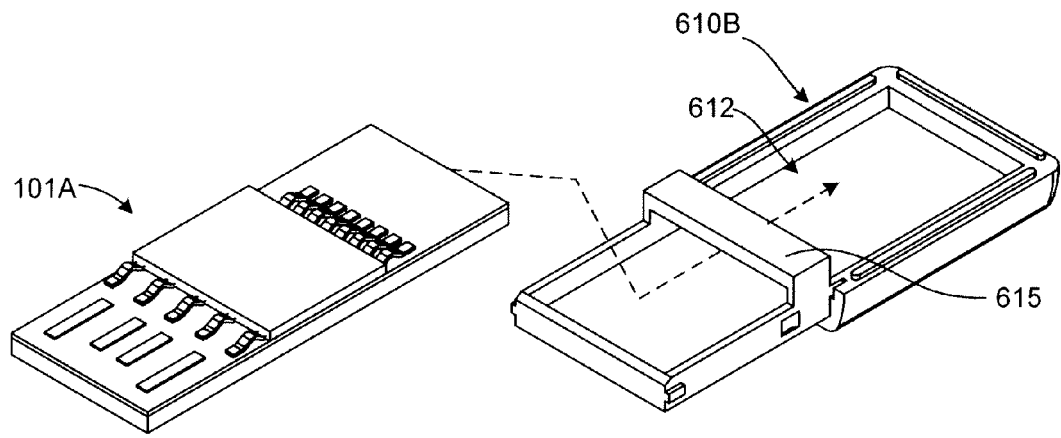
FIGS. 18(A) and 18(B) are exploded perspective and front top perspective views, respectively, showing assembly of a sub-assembly into a housing portion of FIG. 17 according to an embodiment of the present invention.
Figure 18B:
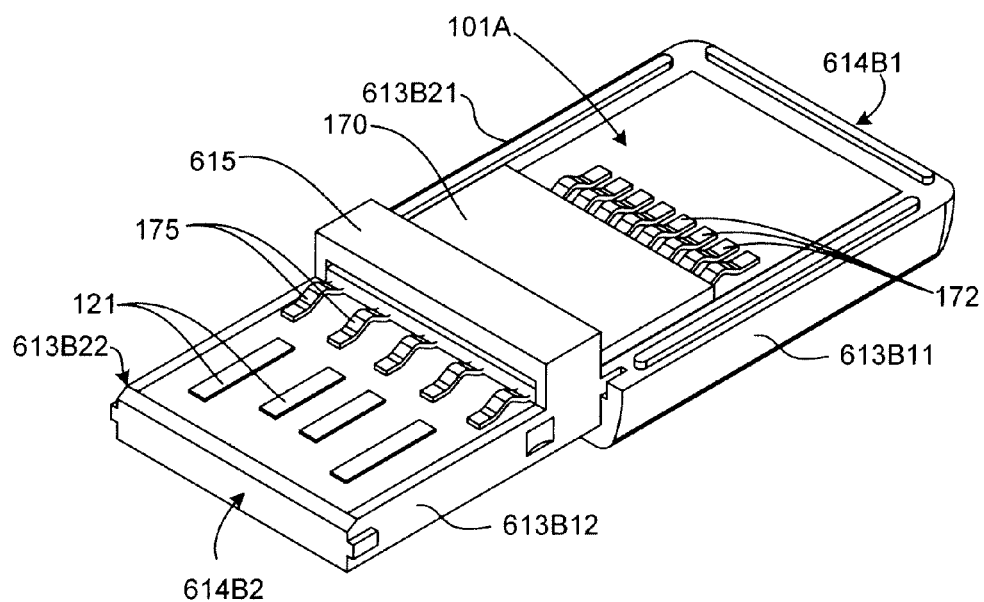
Figure 19A:
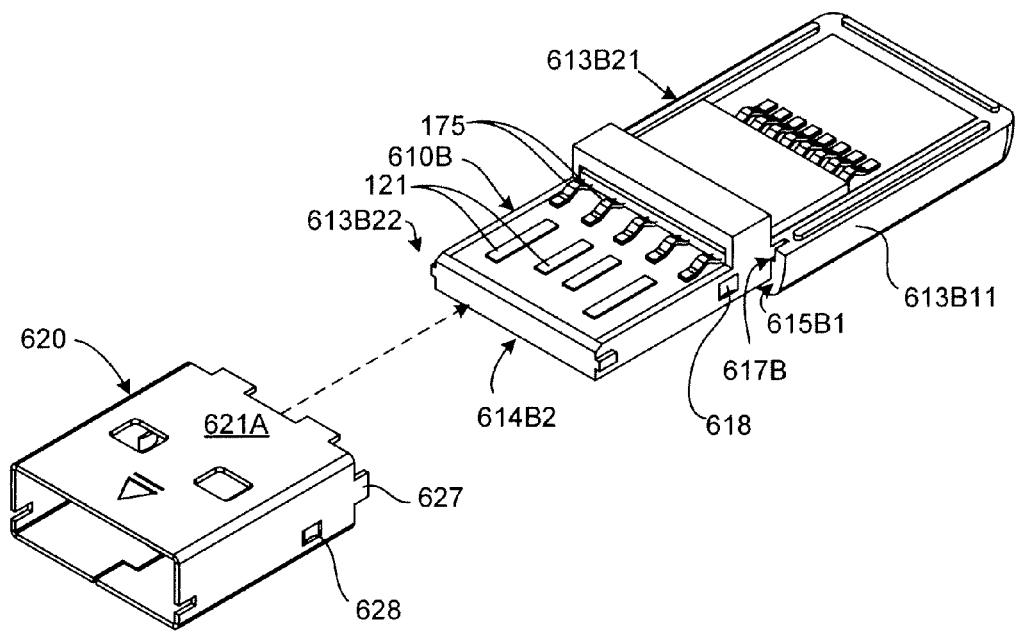
FIGS. 19(A) and 19(B) are exploded perspective and front top perspective views, respectively, showing assembly of a plug shell onto the partial assembly of FIG. 18(B) according to an embodiment of the present invention.
Figure 19B:
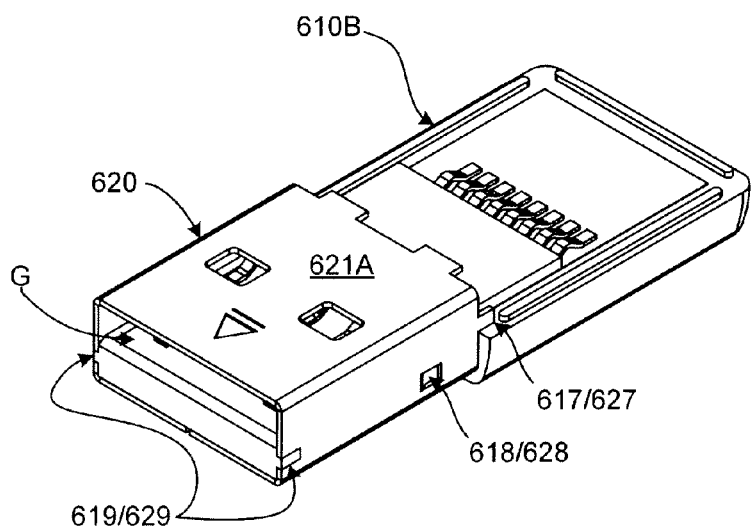

The assembly of card reader 101-1 is now described with reference to FIGS. 18(A) to 22(C). Referring to FIG. 18(A), sub-assembly 101A is inserted into lower housing 610B by tilting and sliding sub-assembly 101A into recess 612 through the opening defined by raised collar structure 615. When fully inserted, as shown in FIG. 18(B), sub-assembly 101A settles snuggly between side walls 613B11, 613B21, 613B21 and 613B22, and between rear wall 614B1 and front wall 614B2, with USB contacts 121 disposed adjacent to front wall 614B2. Note that connector 170 is positioned relative to raised collar structure 615 such that pins 175 are disposed in front of collar structure 615, and pins 172 are disposed behind collar structure 615. Referring to FIGS. 19(A) and 19(B), metal USB connector head cover 620 is then slid over the front end of lower housing portion 610B and secured by way of tabs 627, which are received in slots 617 disposed on front surface 615B1 of side wall portions 613B11 and 613B21. When fully assembled, bumps 628 are resiliently engaged into notches 618, and protrusions 619 are received in notches 629 to secure head cover 620 onto lower housing portion 610B, which further serve to secure head cover 620 to lower housing portion 610B. Note that upper wall 621A forms a gap G that allows access to USB contacts 121 and pins 177 during subsequent operation. Finally, as shown in FIG. 20(A), top cover 610A is lowered at an angle onto the sub-assembly of FIG. 19(B) such that slots 617A receive tabs 627. Then, the rear end of top cover 610A is pressed downward toward lower housing portion 610B, which causes locking ribs 616 to engage (i.e., snap-couple) with corresponding grooves (now shown) formed on lower surfaces of top cover 610A. The thus completed card reader 101-1 is shown in top and bottom views in FIGS. 20(B) and 20(C), respectively.

Referring to block 295 located at the bottom of FIG. 5, a final procedure in the manufacturing method of the present invention involves testing, optional marking, packing and shipping the individual card reader devices. Visually or/and electrically test rejects are removed from the good population as defective rejects. The good card readers are then packed into custom made boxes which are specified by customers. The final packed products will ship out to customers following correct procedures with necessary documents.

Figure 21:
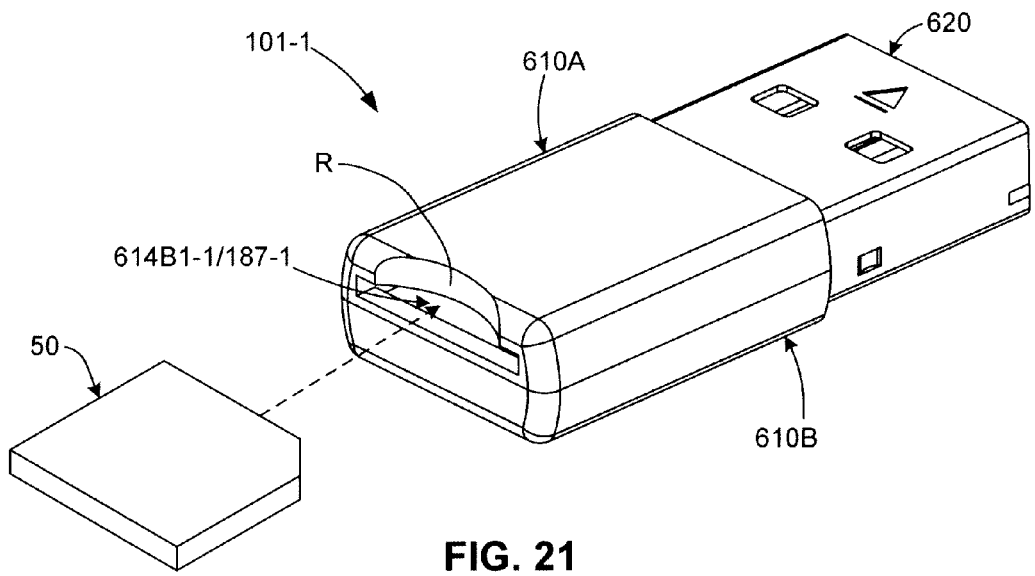
FIG. 21 is an exploded perspective view showing the insertion of a micro-SD card into the card reader of FIG. 20(B)
Figure 22A:
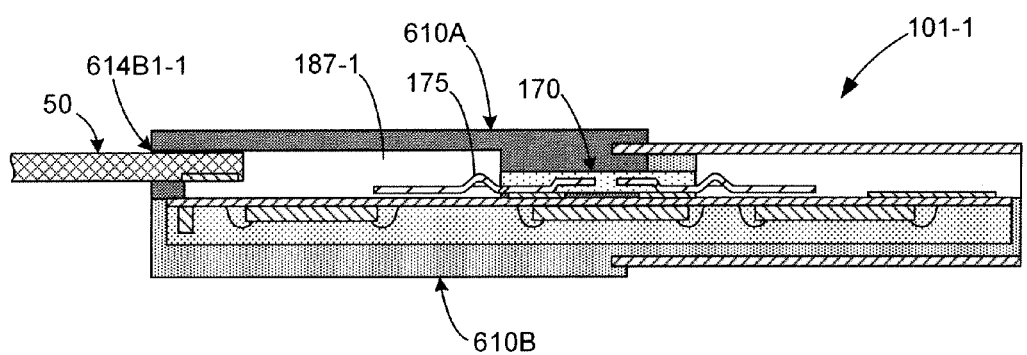
FIGS. 22(A) and 22(B) are cross-sectional side views showing the insertion of a micro-SD card into the card reader of FIG. 20(B)
Figure 22B:
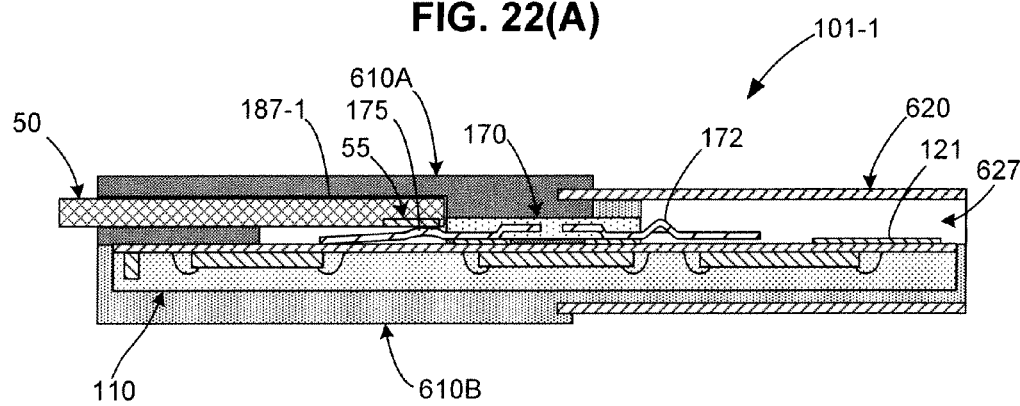

FIGS. 21, 22(A) and 22(B) depict the manual insertion of micro-SD card 50 into card reader 101-1, which facilitates communication between micro-SD card 50 and a host system (e.g., host system 105, see FIG. 2). As indicated in FIGS. 21 and 22(A), micro-SD card 50 is inserted through opening 614B1-1 into slot 187-1 until, as indicated in FIG. 22(B), contacts 55 of micro-SD card 50 resiliently compress the curved portions of rear-facing contact structures 175, thereby facilitating communications between micro-SD card 50 and PCBA 110 (when power is applied) by way of USB contacts 121 and forward-facing contact structures 172. As indicated in FIG. 21, top cover 610A includes a curved recess R for facilitating removal of micro-SD card 50 after completion of a communication session.

In addition to providing functions as a micro-SD card reader, card readers formed in accordance with the present invention may be modified to serve both as "standard" USB devices and as micro-SD card readers, thus enhancing their functionality. As suggested in the above example, overall manufacturing costs are reduced by utilizing unpackaged controller and flash memory dies (i.e., by eliminating the packaging costs associated with SMT-ready controller and flash memory devices). A dual dual-purpose controller is provided (as described below with reference to FIG. 23) to facilitate dual-purpose operation. In addition, space saving arrangements are described below with reference to FIGS. 24 and 25 for providing the needed significant memory capacity for use in the USB device mode (i.e., without requiring the insertion of a micro-SD card) without increasing the overall size of the resulting card reader.

Figure 23:
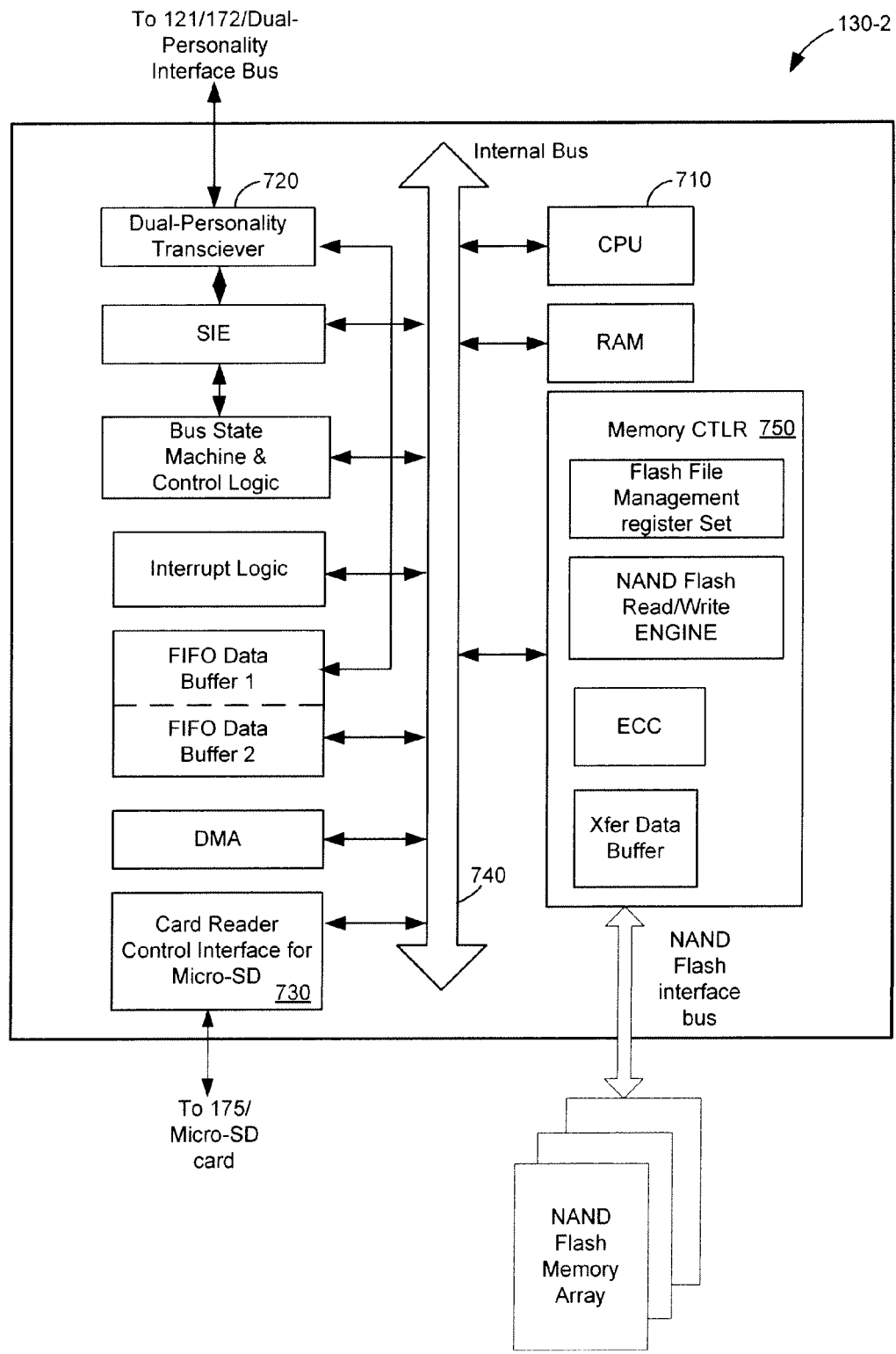
FIG. 23 is a block diagram showing a dual-personality controller circuit of a card reader according to an embodiment of the present invention.

FIG. 23 is a block diagram showing a simplified dual-purpose controller 130-2 according to another embodiment of the present invention. CPU 710 communications with a dual-personality transceiver 720 and a card reader control interface 730 by way of an internal bus 740. Dual-personality transceiver 720 operates in a manner similar to that described above with reference to host system 105 (FIG. 2) to communicate with both standard USB contact pads 121 and extended purpose contact structures 172 in order to communicate with a host system, e.g., by way of socket 190 (see FIG. 2). Card reader control interface 730 communicates in the manner described above to communicate with a micro-SD card by way of extended purpose contact structures 175. Note that controller 130-2 includes a memory controller 750 for controlling read/write operations to flash memory circuits that are part of the PCBA hosting dual-purpose controller 130-2, thereby facilitating the dual functions (i.e., card reader and USB-type device) that are described above.

Figure 24:
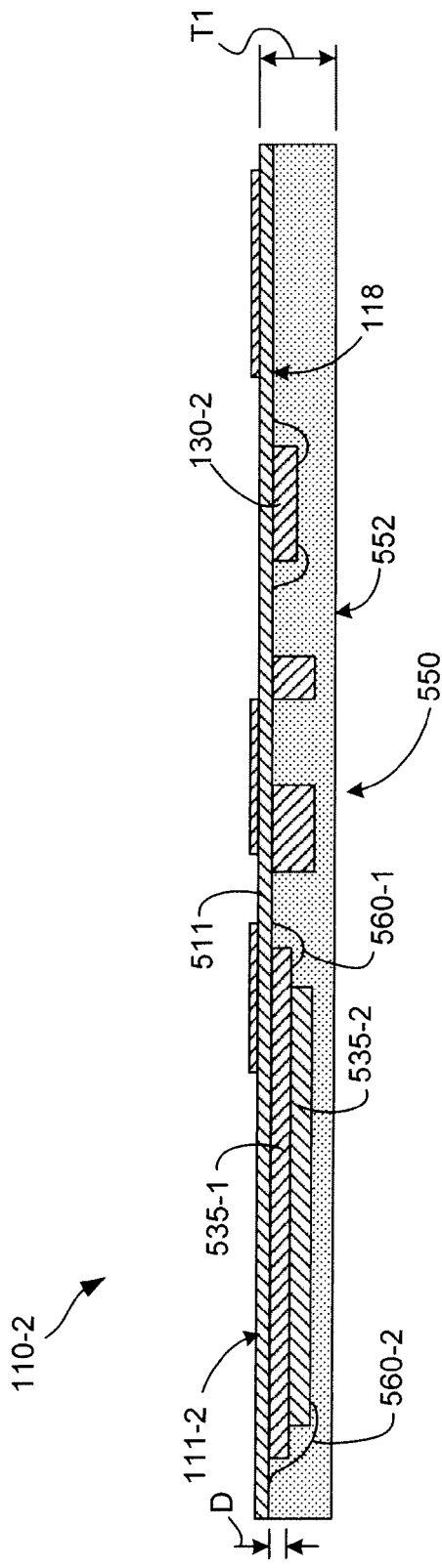
FIG. 24 is simplified cross-sectional side view showing a modular USB device including stacked-memory according to another embodiment of the present invention.

FIG. 24 is simplified cross-sectional side view showing a stacked-memory PCBA 110-2 in which dual-purpose controller 130-2 accesses a first flash memory chip 535-1 and a second flash memory chip 535-2. First flash memory chip 535-1 is mounted on an upper surface 118 of a PCB 111-2 and connected by first wire bonds 560-1 to PCB 111-2 in the manner described above. Because the IC die height (thickness) D is much smaller than packaged flash memory devices, and because the thickness T1 of USB device 500 is set, for example, at 2.0 mm to assure a snug fit of the card reader inside a female USB socket (e.g., socket 190, shown in FIG. 1(A)), the present invention facilitates a stacked memory arrangement in which second flash memory die 535-2 is mounted on first flash memory die 535-1 and connected to PCB 111-2 by way of second wire bonds 560-2. In an alternative embodiment (not shown), second flash memory die 535-2 may be connected to contacts provided on first flash memory die 535-1 by associated wire bonds. This stacked memory arrangement greatly increases memory capacity of the card readers without increasing the footprint (i.e., thickness T1, length and width) of PCBA 110-2. PCBA 110-2 is then processed and assembled as described above to produce a corresponding completed card reader device.

Figure 25:
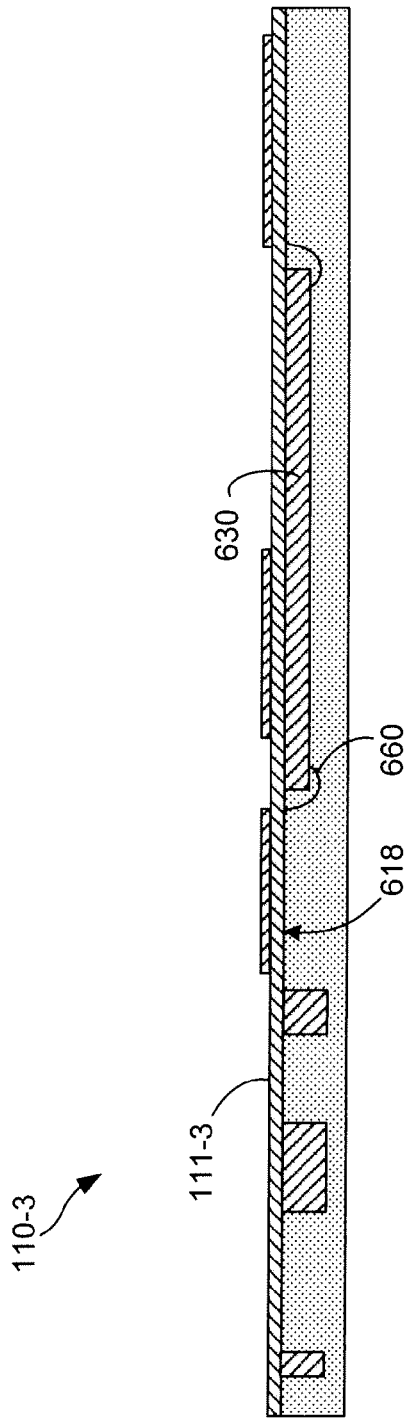
FIG. 25 is simplified cross-sectional side view showing a single-chip modular USB device according to another embodiment of the present invention.

FIG. 25 is simplified cross-sectional side view showing a PCBA 110-3 including stacked-memory according to another embodiment of the present invention. PCBA 110-3 is distinguished over the previous embodiments in that, instead of separate controller and flash memory chips, PCBA 110-3 utilizes a single-chip dual-purpose controller/flash die 630 that is connected to a PCB 111-3 by way of wire bonds 660 in the manner described above, and is characterized in that single-chip dual-purpose controller/flash die 630 includes both a dual-purpose controller circuit and one or more flash block mass storage circuits that are interconnected by a bus.

FIG. 26 is an exploded perspective view showing an extended Universal-Serial-Bus (USB) dual-personality card reader 101-2 according to another specific embodiment that includes sub-assembly 101A (described above), an external housing 180-2, and a metal USB connector head cover (plug shell) 830. Housing 180-2 is produced or procured in accordance with block 280 of FIG. 5, and sub-assembly 101A is mounted inside housing 180-2 in accordance with block 290 of FIG. 5.

Housing 180-2 includes a main housing portion 810 and a tray portion 820 that are pre-molded plastic structures. Main housing portion 810 includes an upper wall 811-1, a lower wall 811-2, opposing side walls 813-1 and 813-2, a rear wall 814-1 defining a slot opening 814-1A (shown in FIG. 27(A)) that communicates with an internal chamber (slot) 187-2, and a front wall 814-2 defining a front opening 814-2A that also communicates with slot 187-2. Tray 820 includes a bottom wall 821, side walls 823-1 and 823-2, and a front wall 824. Rear protrusions 827 are located at the back of lower wall 821 for securing tray 820 inside head cover 830, and front protrusions 829.

Metal head cover 830 includes an upper wall 831-1, a bottom wall 831-2, and side walls 833-1 and 833-2. A pair of connecting flanges 836 extend from the back edges of side walls 833-1 and 833-2, and a pair of notches 829 are defined in the front edges of side walls 833-1 and 833-2.

During assembly, tray 820 is slid into head cover 830 through its rear opening until protrusions 829 are snap-coupled into notches 839. Sub-assembly 101A is then inserted into main housing portion 810 through front opening 815, and the tray/head cover assembly is then mounted over the front end of sub-assembly 101A and pushed inward such that the front end of sub-assembly 101A is pressed backward by front wall 824. When the tray/head cover assembly is fully inserted, the rear end of sub-assembly 101A is pressed against rear wall 814-1 of main housing portion 810, and flanges 836 become snap-coupled and held by corresponding structures (not shown) disposed behind front wall 814-2. The fully assembled card reader 101-2 is shown in FIGS. 27(A) and 27(B).

Figure 28:
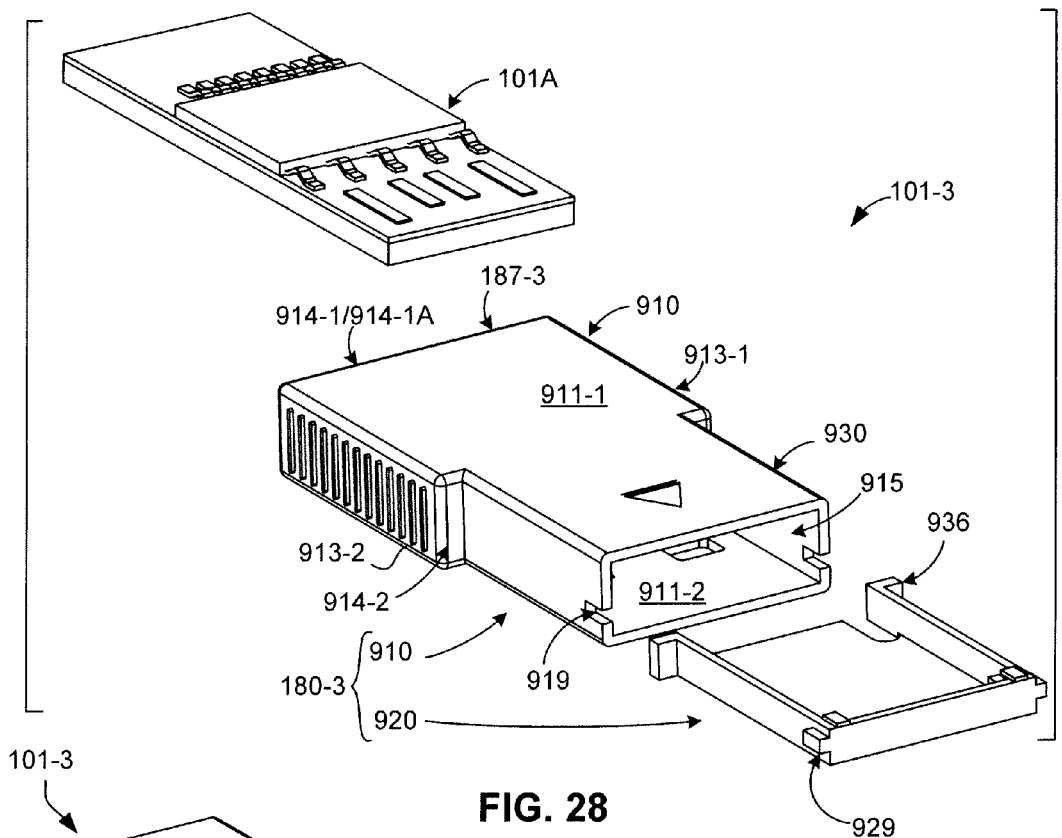
FIG. 28 is an exploded perspective view showing a card reader according to another embodiment of the present invention.

FIG. 28 is an exploded perspective view showing an extended Universal-Serial-Bus (USB) dual-personality card reader 101-3 according to another specific embodiment that includes sub-assembly 101A (described above) and an external housing 180-3 that includes a main housing portion 910 and a tray portion 920 that are pre-molded plastic structures. Main housing portion 910 includes an upper wall 911-1, a lower wall 911-2, opposing side walls 913-1 and 913-2, a rear wall 914-1 defining a slot opening 914-1A (shown in FIG. 29(A)) that communicates with an internal chamber (slot) 187-3. Disposed at the front end of main housing portion 910 is an integrally formed plastic head cover 930 that serves the purpose of metal head cover 830 (described above), but is less expensive in that it is integrally molded with main housing portion 910, and removes at least one assembly step. Tray 920 is similar to tray 820 (described above) and serves a similar purpose.

Figure 29A:
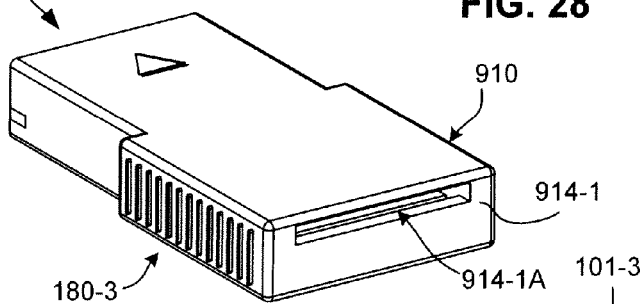
FIGS. 29(A) and 29(B) are rear and front perspective views showing the card reader of FIG. 28 after assembly is completed.
Figure 29B:
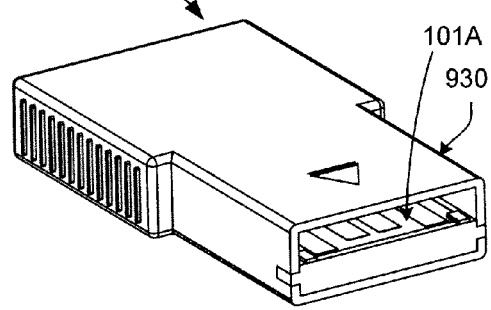
Figure 32A:
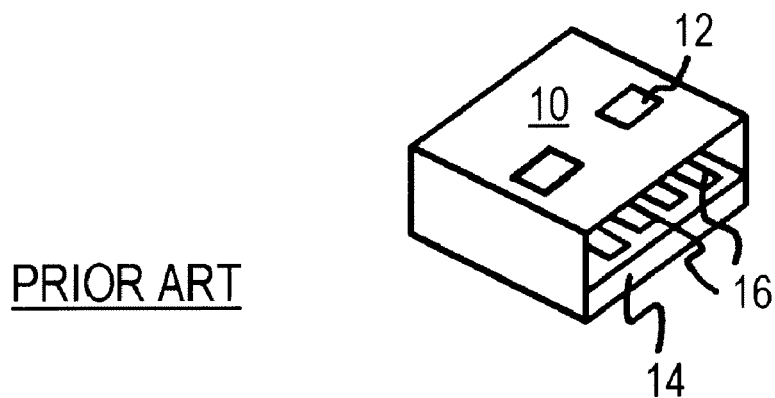
FIGS. 32(A) and 32(B) are front perspective views showing a conventional USB male plug and a conventional USB female socket, respectively.
Figure 32B:
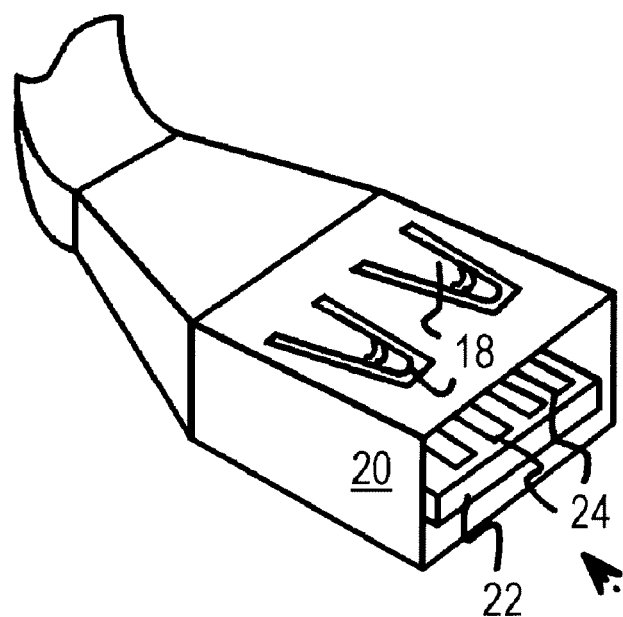

During assembly, sub-assembly 101A is inserted into main housing portion 910 through front opening 915, and then the rear end of tray 920 is squeezed and slid into front opening 915 until front protrusions 929 are snap-coupled into notches 919. When the tray 920 is fully inserted, the rear end of sub-assembly 101A is pressed against rear wall 914-1 of main housing portion 910, and flanges 936 become snap-coupled and held by shoulder structures 914-2 formed at the rear end of plastic head cover 930. The fully assembled card reader 101-3 is shown in FIGS. 29(A) and 29(B).

FIG. 30 is an exploded perspective view showing a "low-profile" extended Universal-Serial-Bus (USB) dual-personality card reader 101-4 according to another specific embodiment that includes sub-assembly 101A (described above) and an external housing 180-4 that includes a main housing portion 1010 and a bottom cover portion 1020 that are pre-molded plastic structures. Main housing portion 1010 includes an upper wall 1011-1, opposing side walls 1013-1 and 1013-2, a rear wall 1014-1 defining a slot opening 1014-1A (shown in FIG. 31(A)) that communicates with an internal chamber (slot) 187-4. A front tray structure 1030 is integrally formed and extends from side walls 1013-1, and defines a trough 1012 for holding a front end of sub-assembly 101A. Main housing portion 1010 also includes a bottom opening 1011-1A (viewed through trough 1012).

During assembly, sub-assembly 101A is inserted into main housing portion 1010 through bottom opening 1011-1A such that the front end of sub-assembly 101A is received in tray 1012, and then the rear end of sub-assembly 101A is pushed into the space below upper wall 1011-1. Bottom cover 1020 is then secured over lower opening 1011-1A using ultrasonic welding. The fully assembled card reader 101-4 is shown in FIGS. 31(A) and 31(B).

Although the present invention has been described with respect to certain specific embodiments, it will be clear to those skilled in the art that the inventive features of the present invention are applicable to other embodiments as well, all of which are intended to fall within the scope of the present invention. For example, although the present invention is described above as supporting micro-SD cards, the disclosed embodiments may be altered using known techniques to serve as card readers for other types of memory devices, including standard SD cards, MMC cards, Mini-SD cards, Micro-SD cards and memory stick cards. In addition, the socket and related rear-facing pins may be selected to connect with two or more of the memory device types (e.g., SD and MMC).

The invention claimed is:

1. An extended Universal-Serial-Bus (USB) dual-personality card reader having a connector plug that is compatible with both a standard USB socket and an extended multiple pin USB socket having both four standard USB contacts and a plurality of dual-personality contacts, said card reader comprising:
   a printed circuit board assembly (PCBA) including:
      a printed circuit board (PCB) having opposing first and second surfaces,
      a plurality of metal contacts disposed on the first surface of the PCB, the plurality of metal contacts including four standard USB contact pads and a plurality of extended purpose contact pads, a dual-personality communication integrated circuit (IC) mounted on the second surface, and a plurality of conductive traces formed on the PCB such that each conductive trace is electrically connected between at least one of said plurality of metal contacts and said a dual-personality communication IC;

a plurality of first extended-use contact structures and a plurality of second extended-use contact structures disposed on the first surface of the PCB such that the first extended-use contact structures are disposed between the second extended-use contact structures and the standard USB contact pads, wherein each of said first and second extended-use contact structures is connected to a corresponding contact pad of said plurality of extended purpose contact pads; and an external housing mounted over the first surface of the PCB, wherein said standard USB contact pads and said plurality of first extended-purpose contact structures are disposed outside of said housing and form said connector plug arranged such that each of said standard USB contact pads is contacted by a corresponding standard USB contact of said extended multiple pin USB socket and each of said first extended-purpose contact structures is contacted by a corresponding dual-personality contact of said extended multiple pin USB socket when said connector plug is inserted into said extended multiple pin USB socket, and wherein said external housing includes a socket for detachably receiving a flash memory device such that each contact pad of the flash memory device contacts a corresponding one of said second extended-use contact structures, thereby enabling communication between said flash memory device and said dual-personality communication IC.

2. The card reader according to claim 1, wherein the plurality of second extended-use contact structures include eight first contact pins, each said first contact pin being attached to said corresponding contact pad of said plurality of extended purpose contact pads, and wherein said socket defines an opening sized to receive a micro Secure-Digital (micro-SD) card such that each of eight contact pads of said micro-SD card contacts a corresponding one of said eight first contact pins.

3. The card reader according to claim 2, wherein the plurality of first extended-use contact structures comprises five second metal spring structures soldered to said corresponding contact pad of said plurality of extended purpose contact pads, whereby the connector plug comprises said five second metal spring structures and said four standard USB contact pads.

4. The card reader according to claim 3, wherein the eight first metal spring structures and the five second metal spring structures are fixedly connected to a molded plastic body.

5. The card reader according to claim 1, further comprising a molded lead-frame connector including a plastic molded body having a front edge, an opposing rear edge, and a bottom surface extending between the front and rear edges, wherein said first extended-purpose contact structures comprise forward-facing pins extending from the front edge of the plastic molded body, and wherein each forward-facing pin includes an associated first contact pad disposed on said bottom surface, wherein said second extended-purpose contact structures comprise rear-facing pins extending from the rear edge of the plastic molded body, and wherein each rear-facing pin includes an associated second contact pad disposed on said bottom surface, and wherein each said first and second contact pads is soldered to a corresponding contact pad of said plurality of extended purpose contact pads.

6. The card reader according to claim 5, wherein each of said forward-facing pins further includes a step portion extending from said associated first contact pad into said plastic molded body, and wherein each of said rear-facing pins further includes a step portion extending from said associated second contact pad into said plastic molded body.

7. The card reader according to claim 5, wherein each of said forward-facing pins and said rear-facing pins comprises a curved spring section.

8. The card reader of claim 5, wherein the external housing comprises:

a first housing portion defining a trough for receiving said PCBA such that said molded lead-frame connector extends above the trough, and a second housing portion that attached to the first housing such that the second housing portion covers said second extended-use contact structures, wherein said second housing portion includes a rear wall defining a slot opening for receiving said flash memory device; and wherein said card reader further comprises a metal head cover attached to said first housing portion and defines a front opening for accessing said standard USB contact pads and said first extended-purpose contact structures.

9. The card reader of claim 5, wherein the external housing comprises:

a main housing portion defining chamber for receiving a rear portion of said PCBA, wherein a back wall of said main housing portion defines a slot for receiving said flash memory device; and a tray extending from a front opening of said main housing portion, said tray supporting a front portion of said PCBA, and wherein said card reader further comprises a metal head cover attached to said main housing portion and surrounding said tray, said metal head cover defining a front opening for accessing said standard USB contact pads and said first extended-purpose contact structures.

10. The card reader of claim 5, wherein the external housing comprises:

a main housing portion including walls defining a relatively wide chamber for receiving a rear portion of said PCBA, and a relatively narrow plug portion integrally molded to the walls for receiving a front portion of said PCBA, and a tray disposed in the plug portion of the main housing portion, said tray supporting a front portion of said PCBA, and wherein said plug portion defines a front opening for accessing said standard USB contact pads and said first extended-purpose contact structures.

11. The card reader of claim 5, wherein the external housing comprises a main housing portion including walls defining a chamber for receiving a rear portion of said PCBA, and a front tray structure for receiving a front portion of said PCBA such that said standard USB contact pads and said first extended-purpose contact structures are exposed over said front tray structure.

12. The card reader according to claim 1, wherein said PCBA further comprises at least one surface-mount-type passive components, soldered to the second surface, and wherein said dual-personality communication integrated circuit (IC) comprises a die that is connected to said plurality of traces by bond wires.

13. The card reader of claim 12, further comprising a single-piece molded casing formed on the second surface of the PCBA such that said dual-personality communication integrated circuit (IC) and said surface-mount-type passive components are covered by said molded casing, and such that substantially all of the first surface of the PCB is exposed.

14. The card reader of claim 1, wherein said PCBA further comprises one or more flash memory circuits, and said dual-personality communication integrated circuit (IC) includes means for transmitting data between the flash memory circuits and said host by way of said standard USB contact pads.

15. An extended Universal-Serial-Bus (USB) dual-personality card reader having a connector plug that is compatible with both a standard USB socket and an extended multiple pin USB socket having both four standard USB contacts and a plurality of dual-personality contacts, said card reader comprising:
 a modular core component including:
  a printed circuit board assembly (PCBA) including:
   a printed circuit board (PCB) having opposing first and second surfaces,
   a plurality of metal contacts disposed on the first surface of the PCB, the plurality of metal contacts including four standard USB contact pads and a plurality of extended purpose contact pads,
   a dual-personality communication integrated circuit (IC) mounted on the second surface, and
   a plurality of conductive traces formed on the PCB such that each conductive trace is electrically connected between at least one of said plurality of metal contacts and said a dual-personality communication IC;
  a molded lead-frame connector including a plastic molded body having a front edge, an opposing rear edge, and a bottom surface extending between the front and rear edges, a plurality of forward-facing pins extending from the front edge of the plastic molded body, and a plurality of rear-facing pins extending from the rear edge of the plastic molded body, wherein each forward-facing pin includes an associated first contact pad disposed on said bottom surface, wherein each rear-facing pin includes an associated second contact pad disposed on said bottom surface, and wherein each said first and second contact pads is soldered to a corresponding contact pad of said plurality of extended purpose contact pads; and
 an external housing mounted over the first surface of the PCB,
 wherein said standard USB contact pads and said plurality of forward-facing pins are disposed outside of said housing and form said connector plug arranged such that each of said standard USB contact pads is contacted by a corresponding standard USB contact of said extended multiple pin USB socket and each of said first extended-purpose contact structures is contacted by a corresponding dual-personality contact of said extended multiple pin USB socket when said connector plug is inserted into said extended multiple pin USB socket, and
 wherein said external housing includes a socket for removably receiving a flash memory device such that each contact pad of the flash memory device contacts a corresponding one of said plurality of rear-facing pins, thereby enabling communication between said flash memory device and said dual-personality communication IC.

16. A method for producing an USB card reader comprising:
 producing a PCBA, a molded lead-frame connector, and an external housing, wherein the PCBA includes:
  a printed circuit board (PCB) having opposing first and second surfaces,
  a plurality of metal contacts disposed on the first surface of the PCB, the plurality of metal contacts including four standard USB contact pads and a plurality of extended purpose contact pads,
  a dual-personality communication integrated circuit (IC) mounted on the second surface, and
  a plurality of conductive traces formed on the PCB such that each conductive trace is electrically connected between at least one of said plurality of metal contacts and said a dual-personality communication IC; and
 wherein the molded lead-frame connector includes a plastic molded body having a front edge, an opposing rear edge, and a bottom surface extending between the front and rear edges, a plurality of forward-facing pins extending from the front edge of the plastic molded body, and a plurality of rear-facing pins extending from the rear edge of the plastic molded body, wherein each forward-facing pin includes an associated first contact pad disposed on said bottom surface,
 wherein each rear-facing pin includes an associated second contact pad disposed on said bottom surface,
 mounting the molded lead-frame connector on the PCBA to form a sub-assembly such that each said first and second contact pads is soldered to a corresponding contact pad of said plurality of extended purpose contact pads; and
 mounting the sub-assembly in the external housing.

* * * * *